(12) United States Patent
Yang et al.

(10) Patent No.: US 7,634,478 B2
(45) Date of Patent: Dec. 15, 2009

(54) METADATA DRIVEN INTELLIGENT DATA NAVIGATION

(75) Inventors: Jonathan Yang, Bellevue, WA (US); Adam Yeh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1392 days.

(21) Appl. No.: 10/725,665

(22) Filed: Dec. 2, 2003

(65) Prior Publication Data
US 2005/0120021 A1    Jun. 2, 2005

(51) Int. Cl.
*G06F 17/30* (2006.01)
(52) U.S. Cl. ......................................................... 707/10
(58) Field of Classification Search ........................ None
See application file for complete search history.

(56) References Cited

U.S. PATENT DOCUMENTS

| | | | | |
|---|---|---|---|---|
| 5,499,371 | A | 3/1996 | Henninger et al. | 395/700 |
| 6,101,502 | A | 8/2000 | Heubner et al. | 707/103 |
| 6,173,439 | B1* | 1/2001 | Carlson et al. | 717/108 |
| 6,212,524 | B1 | 4/2001 | Weissman et al. | 707/101 |
| 6,360,223 | B1 | 3/2002 | Ng et al. | 707/100 |
| 6,609,123 | B1 | 8/2003 | Cazemier et al. | 707/4 |
| 6,665,644 | B1 | 12/2003 | Kanevsky et al. | 704/275 |
| 6,704,744 | B1* | 3/2004 | Williamson et al. | 707/103 R |
| 6,807,518 | B1 | 10/2004 | Lang | 703/2 |
| 6,862,574 | B1 | 3/2005 | Srikant et al. | 705/10 |
| 6,907,433 | B2 | 6/2005 | Wang et al. | 707/104 |
| 6,964,023 | B2 | 11/2005 | Maes et al. | 715/811 |
| 6,980,980 | B1 | 12/2005 | Yeh | 707/2 |
| 7,007,029 | B1 | 2/2006 | Chen | 707/100 |
| 7,111,010 | B2 | 9/2006 | Chen | 707/102 |
| 7,185,016 | B1 | 2/2007 | Rasmussen | 707/100 |
| 7,315,849 | B2* | 1/2008 | Bakalash et al. | 707/2 |
| 2002/0070953 | A1 | 6/2002 | Barg et al. | 345/700 |
| 2002/0087516 | A1 | 7/2002 | Cras et al. | 707/2 |
| 2002/0147848 | A1 | 10/2002 | Burgin et al. | 709/246 |
| 2003/0120593 | A1 | 6/2003 | Bansal et al. | 705/39 |
| 2003/0187756 | A1 | 10/2003 | Klivington et al. | 705/27 |
| 2004/0181502 | A1 | 9/2004 | Yeh et al. | 707/1 |
| 2004/0215626 | A1 | 10/2004 | Colossi et al. | 707/100 |
| 2005/0038780 | A1 | 2/2005 | De Souza et al. | 707/3 |
| 2005/0120021 | A1 | 6/2005 | Tang et al. | 707/10 |
| 2005/0246370 | A1 | 11/2005 | Rubendall | 707/103 |

OTHER PUBLICATIONS

XML.com, "Mapping DTDs to Databases," http://www.xml.com/lpt/a/2001/05/09/dtdtodbs.html, May 19, 2001.
XML.com, "RAX: An XML Database API," http://www.xml.com/lpt/a/2000/04/26/rax/index.html, Apr. 26, 2000.

(Continued)

*Primary Examiner*—Neveen Abel Jalil
*Assistant Examiner*—Kellye D Buckingham
(74) *Attorney, Agent, or Firm*—Westman, Champlin & Kelly, P.A.

(57) ABSTRACT

A system is provided for enabling a user to extract useful information from a collection of business data. Relationships that connect various data elements are analyzed in order to identify intelligent data navigation paths. The intelligent data navigation paths are utilized as a basis for enabling the user to move between related sets of data.

34 Claims, 19 Drawing Sheets

OTHER PUBLICATIONS

HiTSoftware, "Unifying XML and Relational Database Application Development," Jan. 2003, pp. 1-10.

Braganholo, et al., "On the Updatability of XML Views Over Relational Databases," International Workshop on the Web and Databases (WebDB), Jun. 12-13, 2003, San Diego, California.

Meng, et al., "OrientStore: A Schema Based Native XML Storage System," 29th VLDB Conference, Berlin, German 2003.

Barrett, Alexandra, "Databases Embrace XML," SW Expert, Aug. 2001, pp. 43-47.

Coox, S.V., "Axiomatization of the Evolution of XML Database Schema," Programming Computer Software, vol. 29, No. 3, 2003, pp. 1-7, Jan. 29, 2003.

Hahsler, Dr. Michael. "Knowledge Management Data Warehouses and Data Mining," Department of Information Processing, Vienna University of Economics and BA, Dec. 11, 2001, pp. 2-29.

* cited by examiner

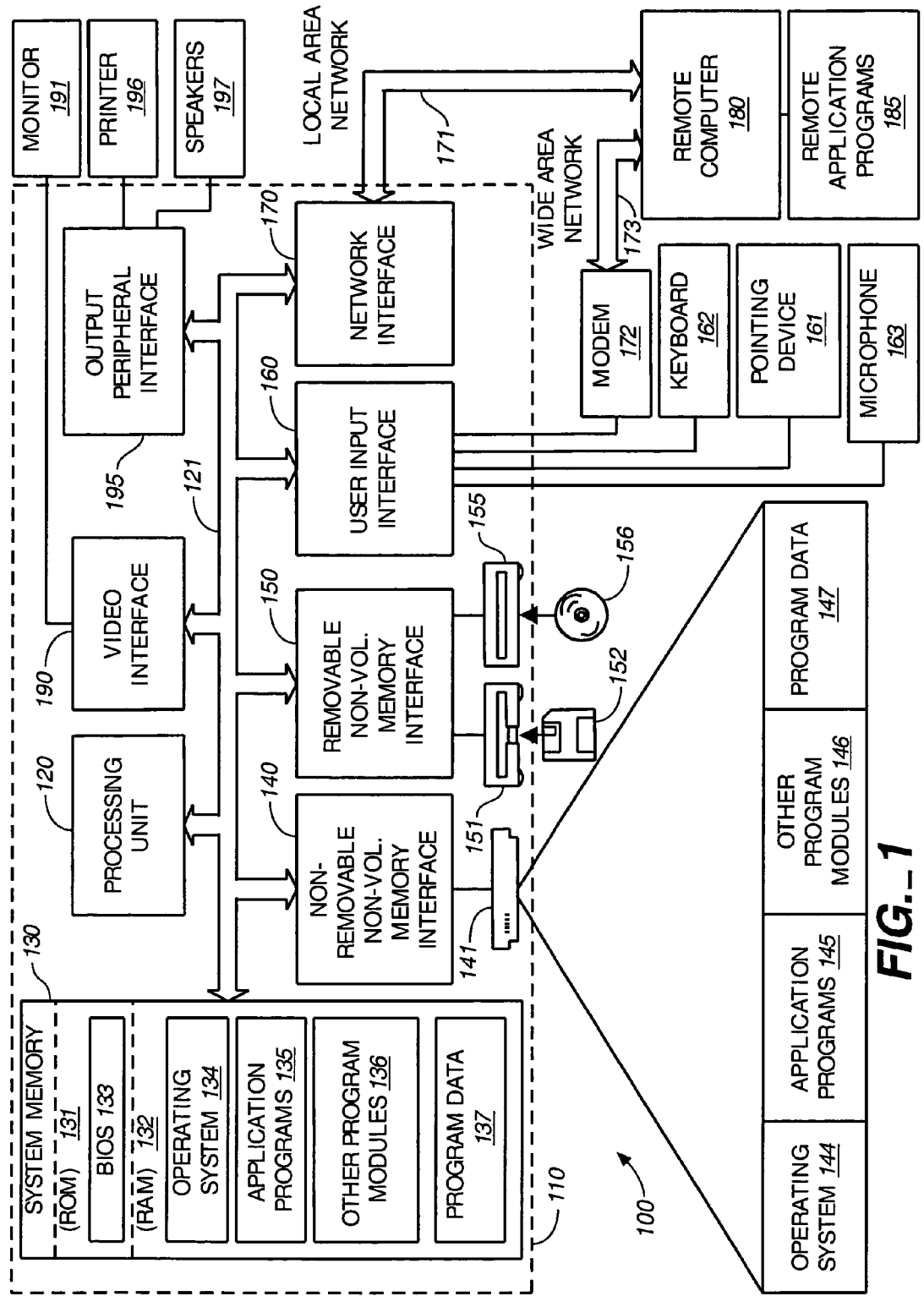
FIG._1

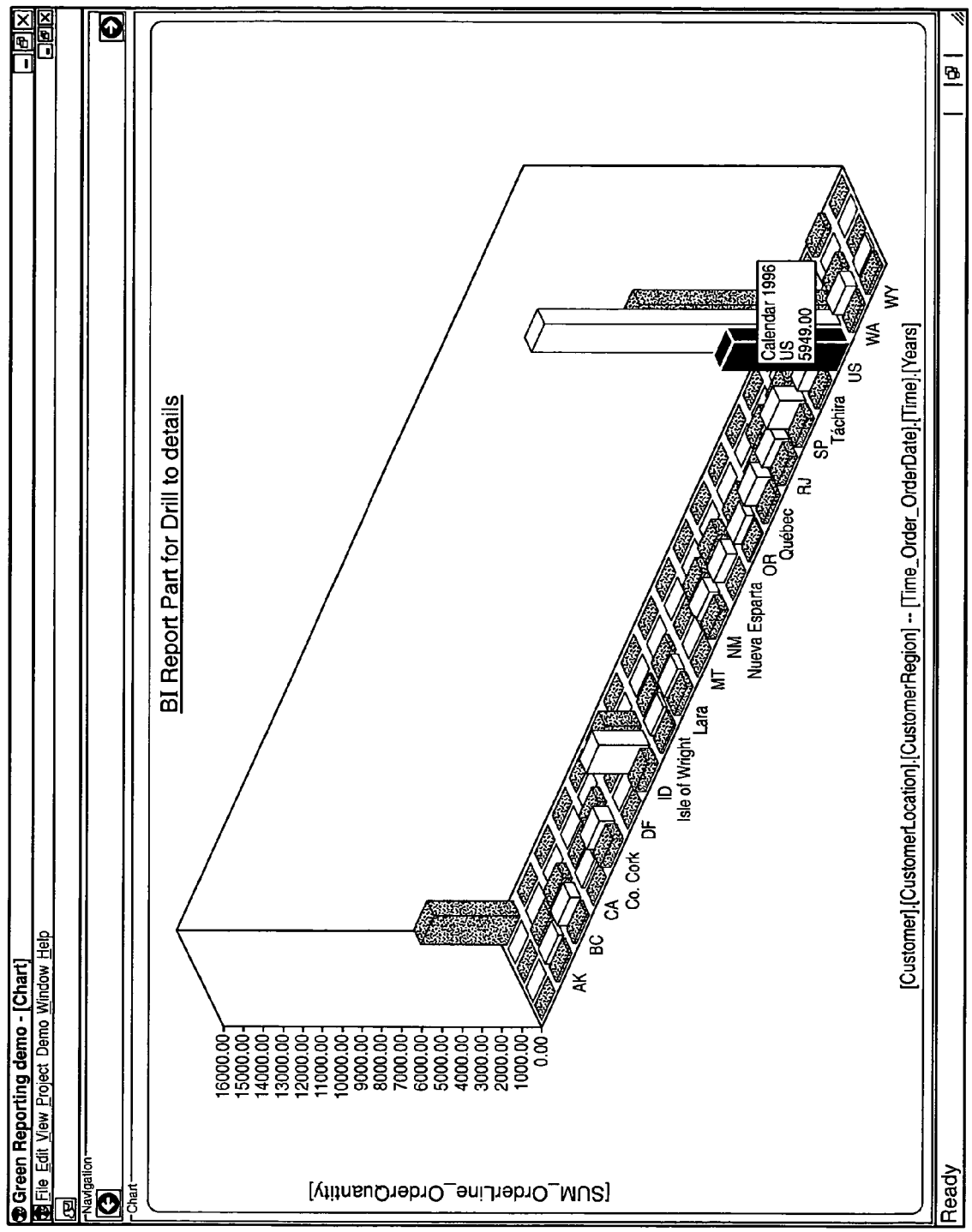
FIG._3

FIG._4

| Customer.CustomerRegion | Customer.CustomerName | Customer.CustomerCity | Customer.CustomerID |
|---|---|---|---|
| US | Maria Anders | Berlin | ALFKI |
| US | Ana Trujillo | México D.F. | ANATR |
| US | Antonio Moreno | México D.F. | ANTON |
| US | Thomas Hardy | London | AROUT |
| US | Christina Berglund | Luleå | BERGS |
| US | Hanna Moos | Mannheim | BLAUS |
| US | Frédérique Citeaux | Strasbourg | BLONP |
| US | Martín Sommer | Madrid | BOLID |
| US | Laurence Lebihan | Marseille | BONAP |
| US | Victoria Ashworth | London | BSBEV |
| US | Patricio Simpson | Buenos Aires | CACTU |
| US | Francisco Chang | México D.F. | CENTC |
| US | Yang Wang | Bern | CHOPS |
| US | Elizabeth Brown | London | CONSH |
| US | Sven Ottlieb | Aachen | DRACD |
| US | Janine Labrune | Nantes | DUMON |
| US | Ann Devon | London | EASTC |
| US | Roland Mendel | Graz | ERNSH |
| US | Diego Roel | Madrid | FISSA |
| US | Martine Rancé | Lille | FOLIG |
| US | Maria Larsson | Bräcke | FOLKO |
| US | Peter Franken | München | FRANK |
| US | Carine Schmitt | Nantes | FRANR |
| US | Paolo Accorti | Torino | FRANS |
| US | Lino Rodriguez | Lisboa | FURIB |
| US | Eduardo Saavedra | Barcelona | GALED |
| US | José Pedro Freyre | Sevilla | GODOS |
| US | Philip Cramer | Brandenburg | KOENE |
| US | Daniel Tonini | Versailles | LACOR |
| US | Annette Roulet | Toulouse | LAMAI |
| US | Renate Messner | Frankfurt a.M. | LEHMS |
| US | Giovanni Rovelli | Bergamo | MAGAA |
| US | Catherine Dewey | Bruxelles | MAISD |
| US | Alexander Feuer | Leipzig | MORGK |
| US | Simon Crowther | London | NORTS |
| US | Yvonne Moncada | Buenos Aires | OCEAN |
| US | Henriette Pfalzheim | Köln | OTTIK |
| US | Marie Bertrand | Paris | PARIS |
| US | Guillermo Fernández | México D.F. | PERIC |
| US | Georg Pipps | Salzburg | PICCO |
| US | Isabel de Castro | Lisboa | PRINI |
| US | Horst Kloss | Cunewalde | QUICK |
| US | Sergio Gutiérrez | Buenos Aires | RANCH |
| US | Maurizio Moroni | Reggio Emilia | REGGC |
| US | Michael Holz | Genève | RICSU |
| US | Alejandra Camino | Madrid | ROMEY |

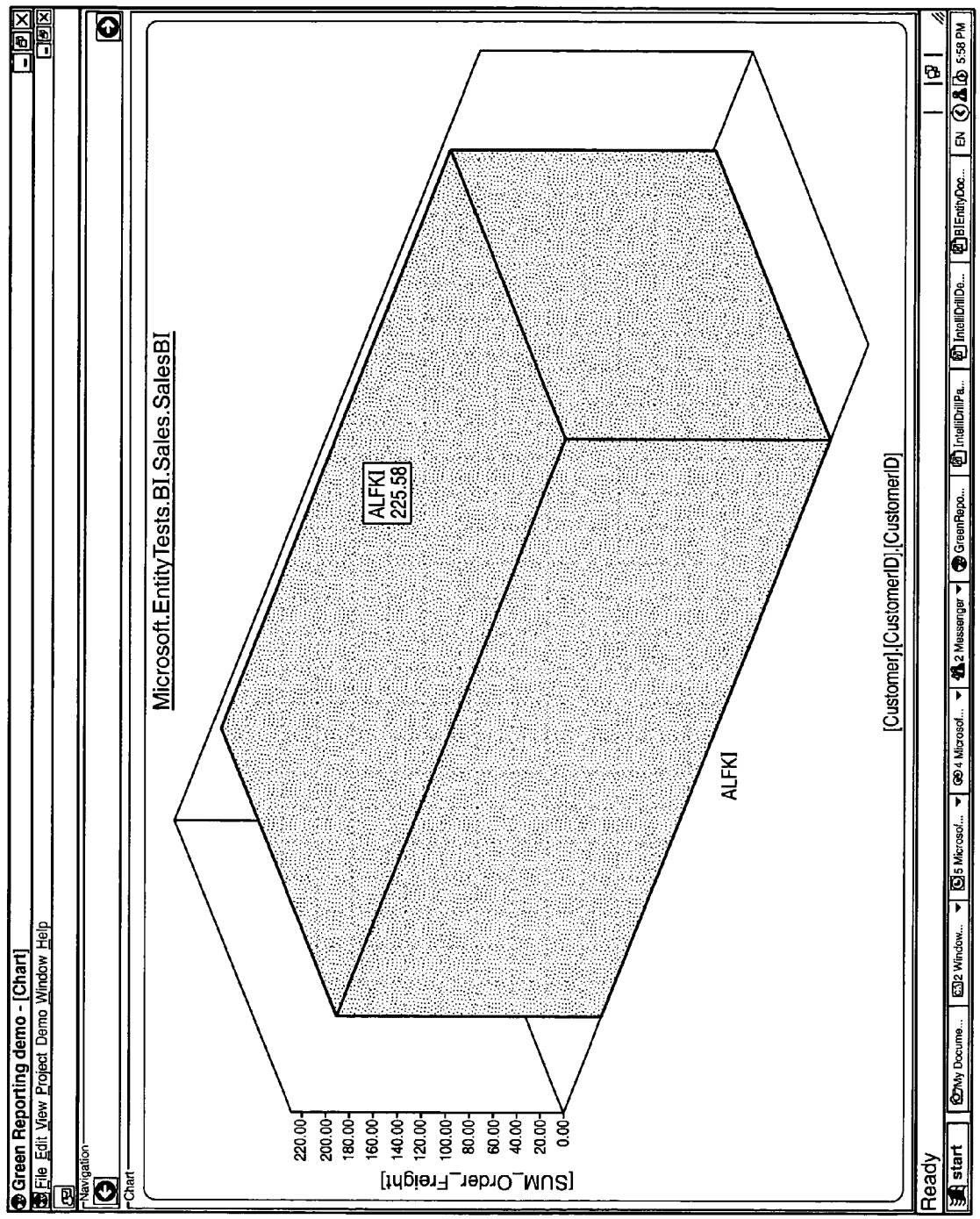
FIG._5

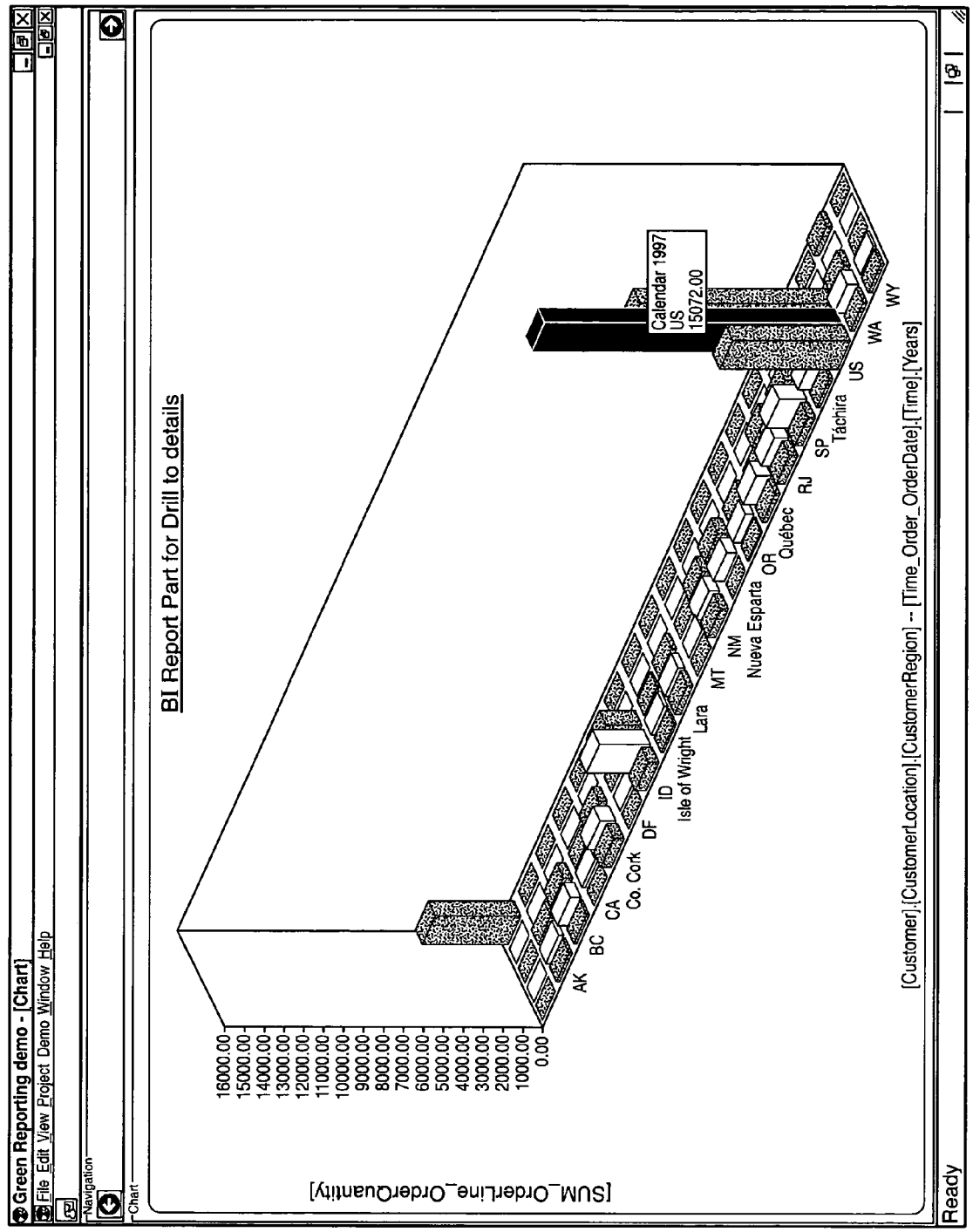
FIG._6

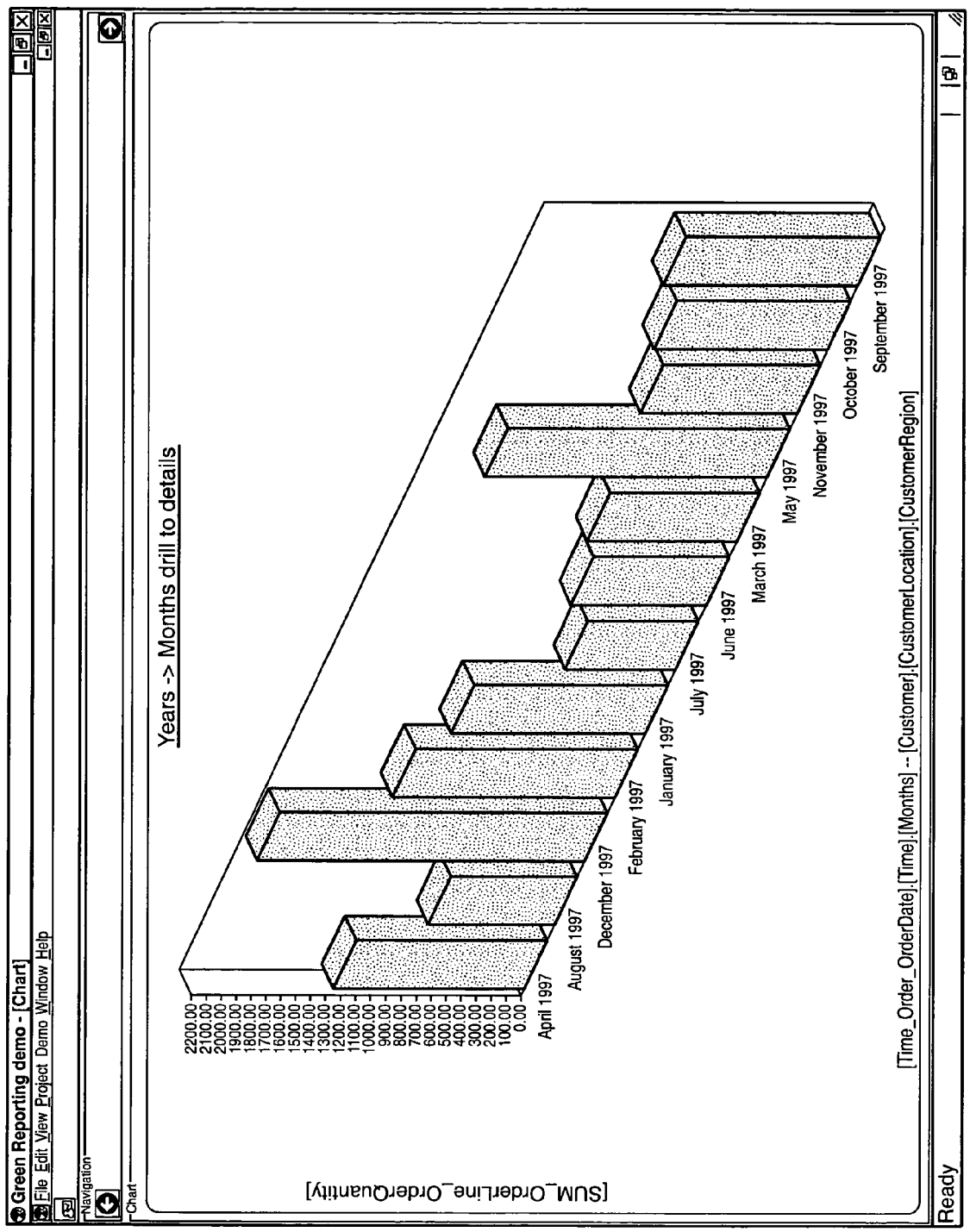
FIG._7

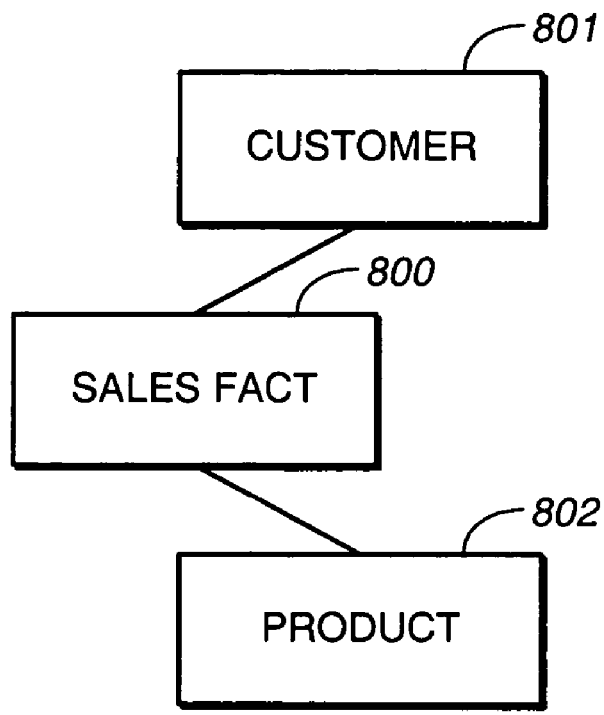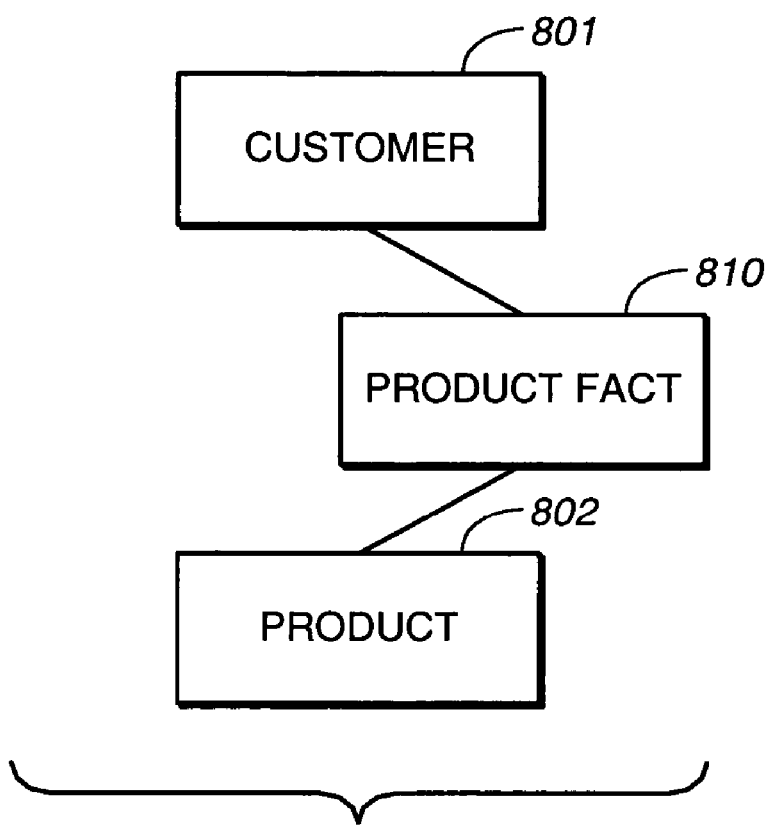
FIG._ 8

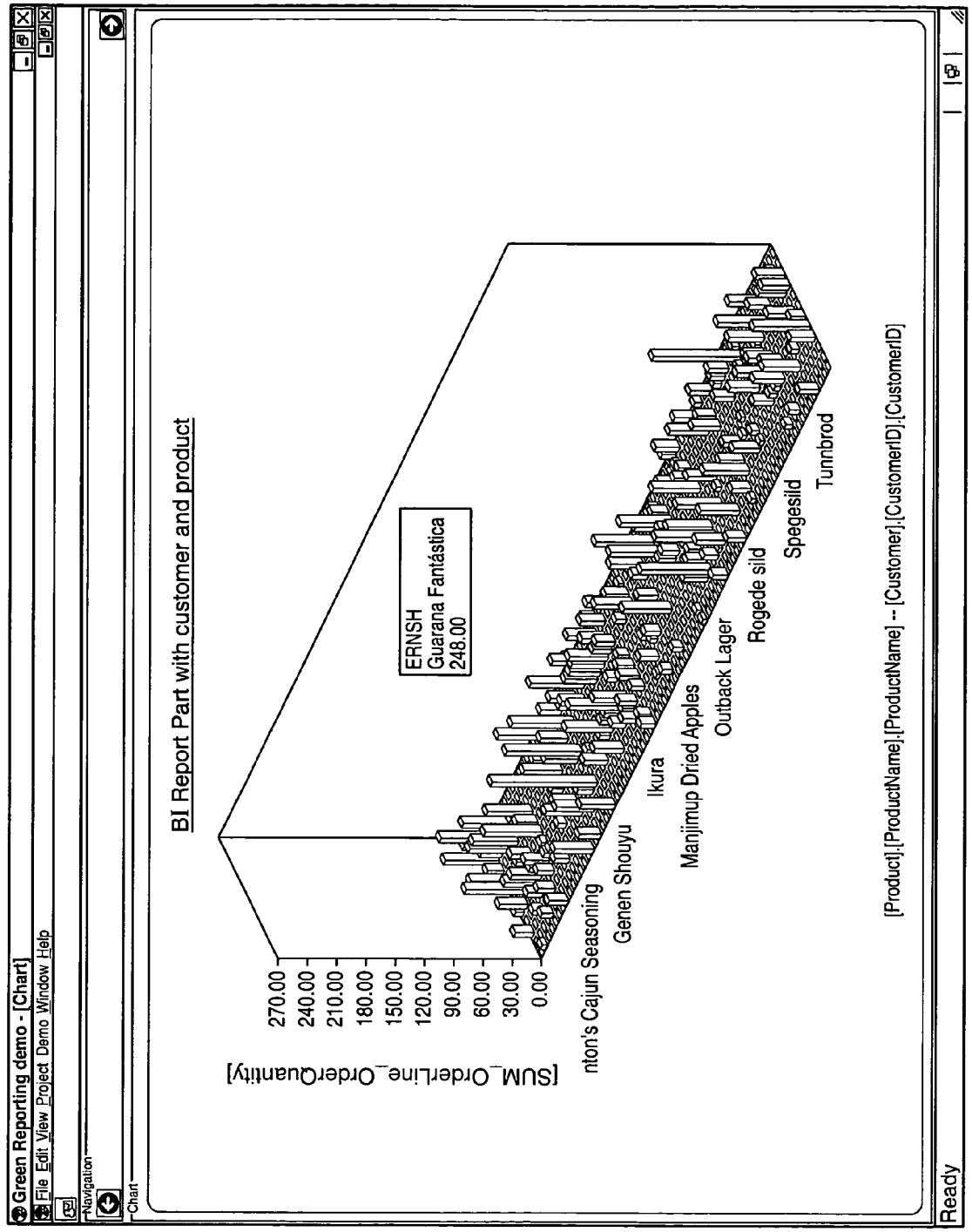
FIG._9

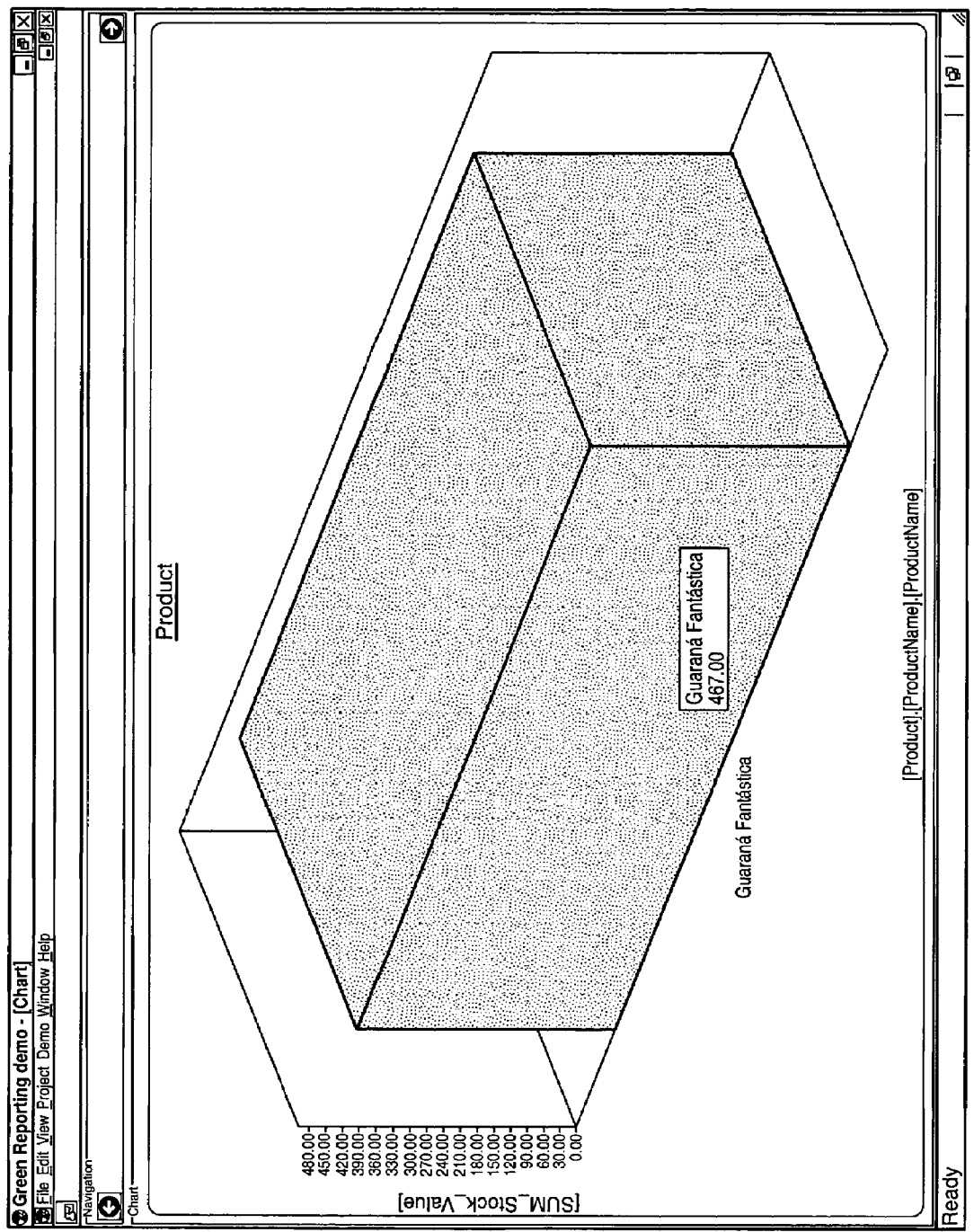
FIG._10

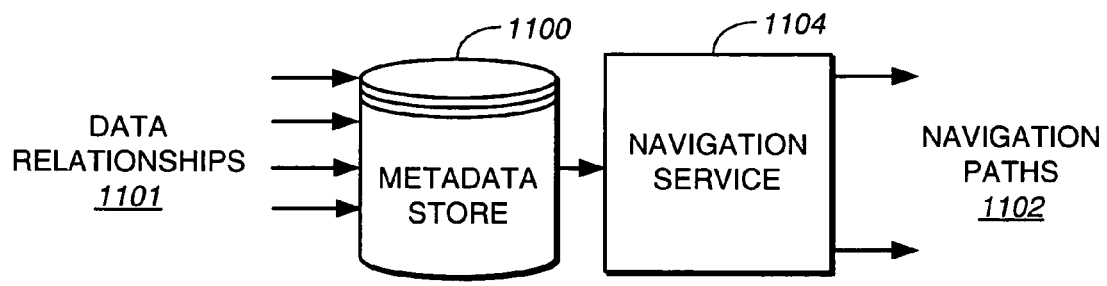
FIG._ 11
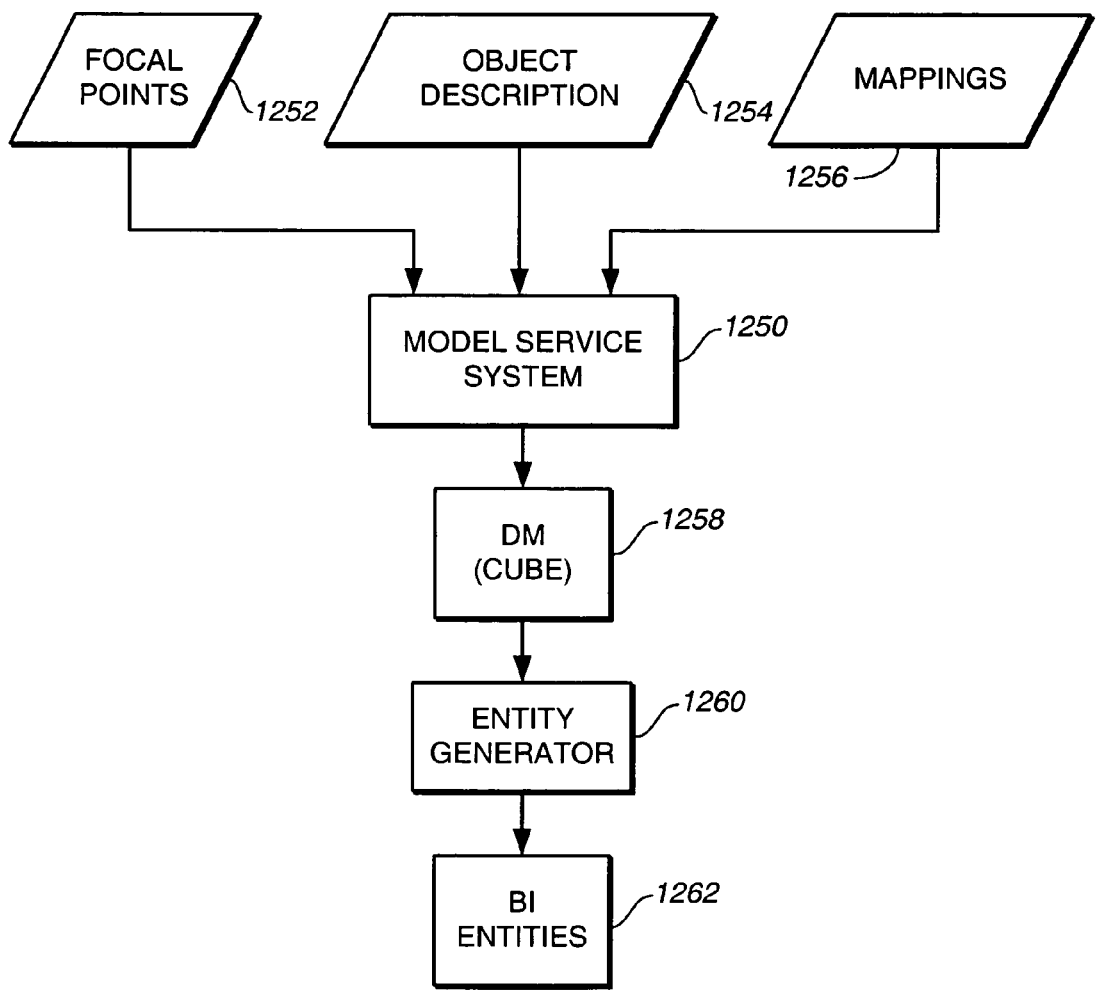
FIG._ 12A

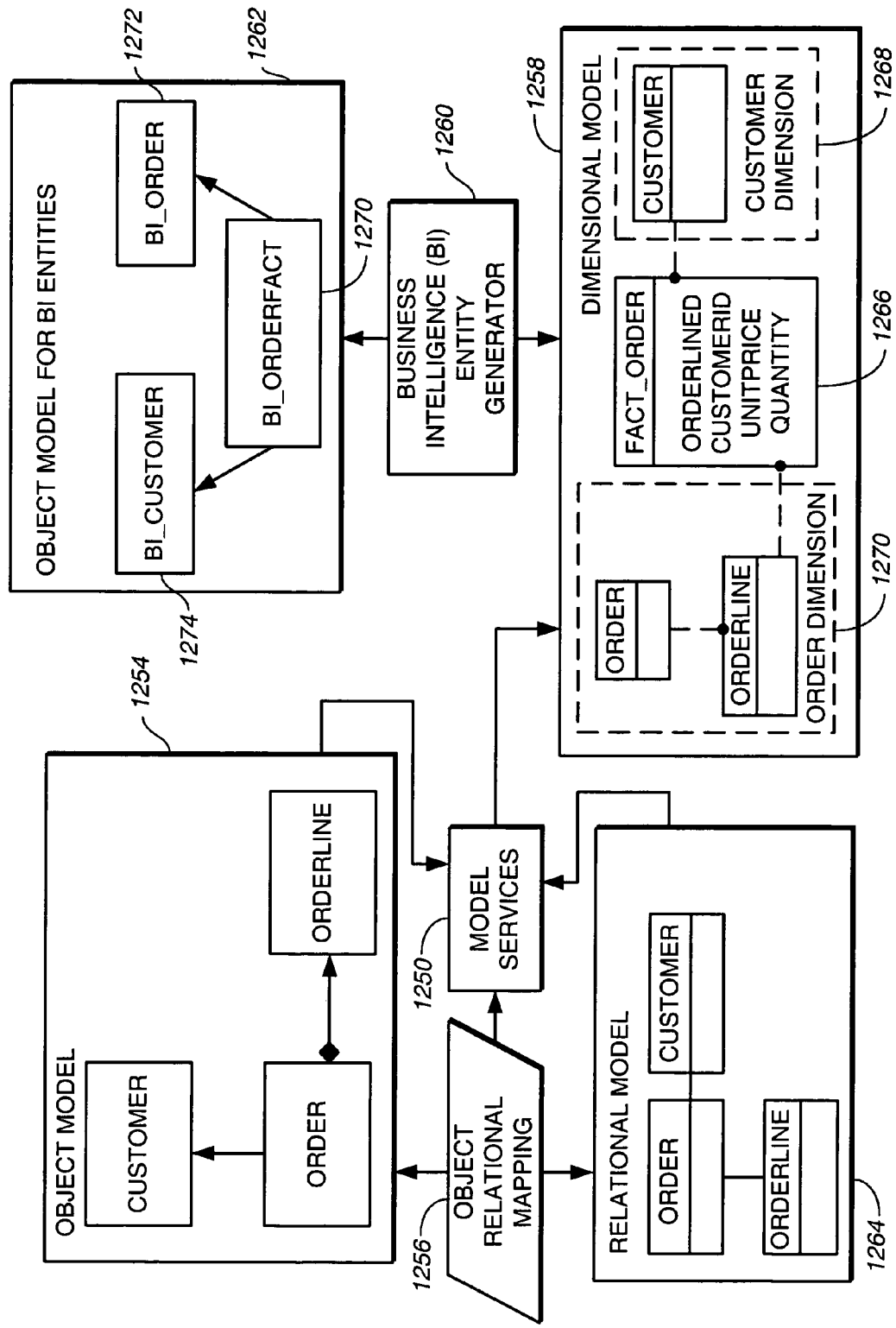
FIG._12B

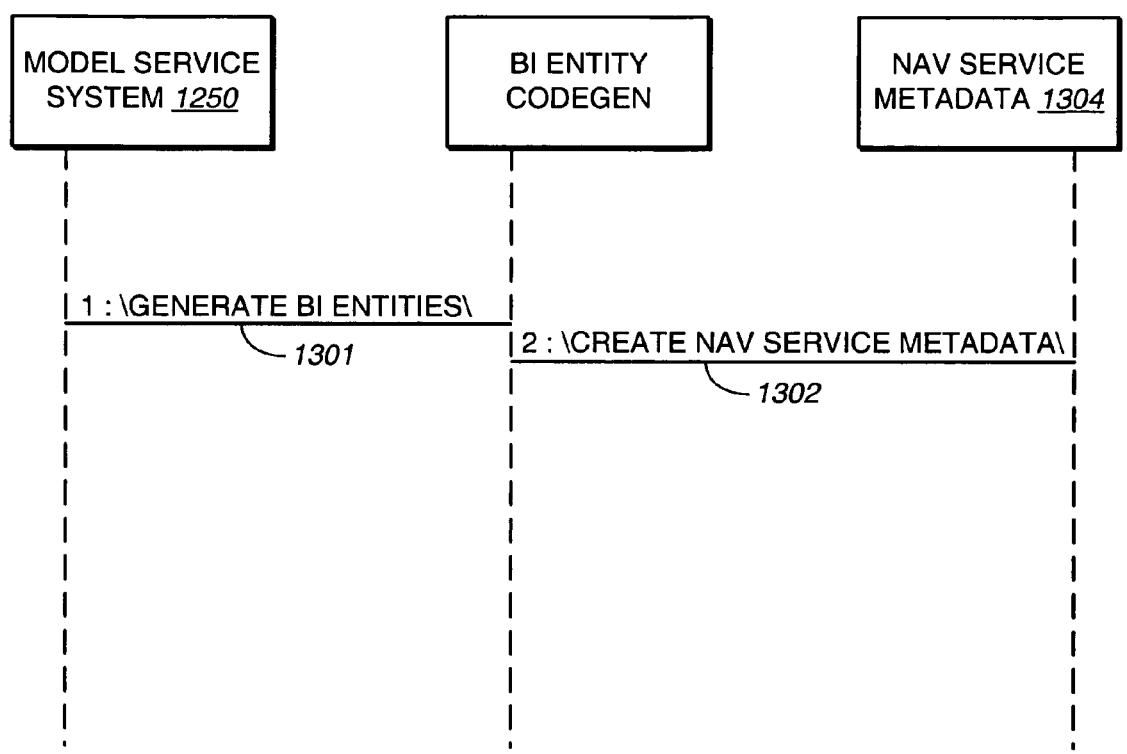
FIG._13

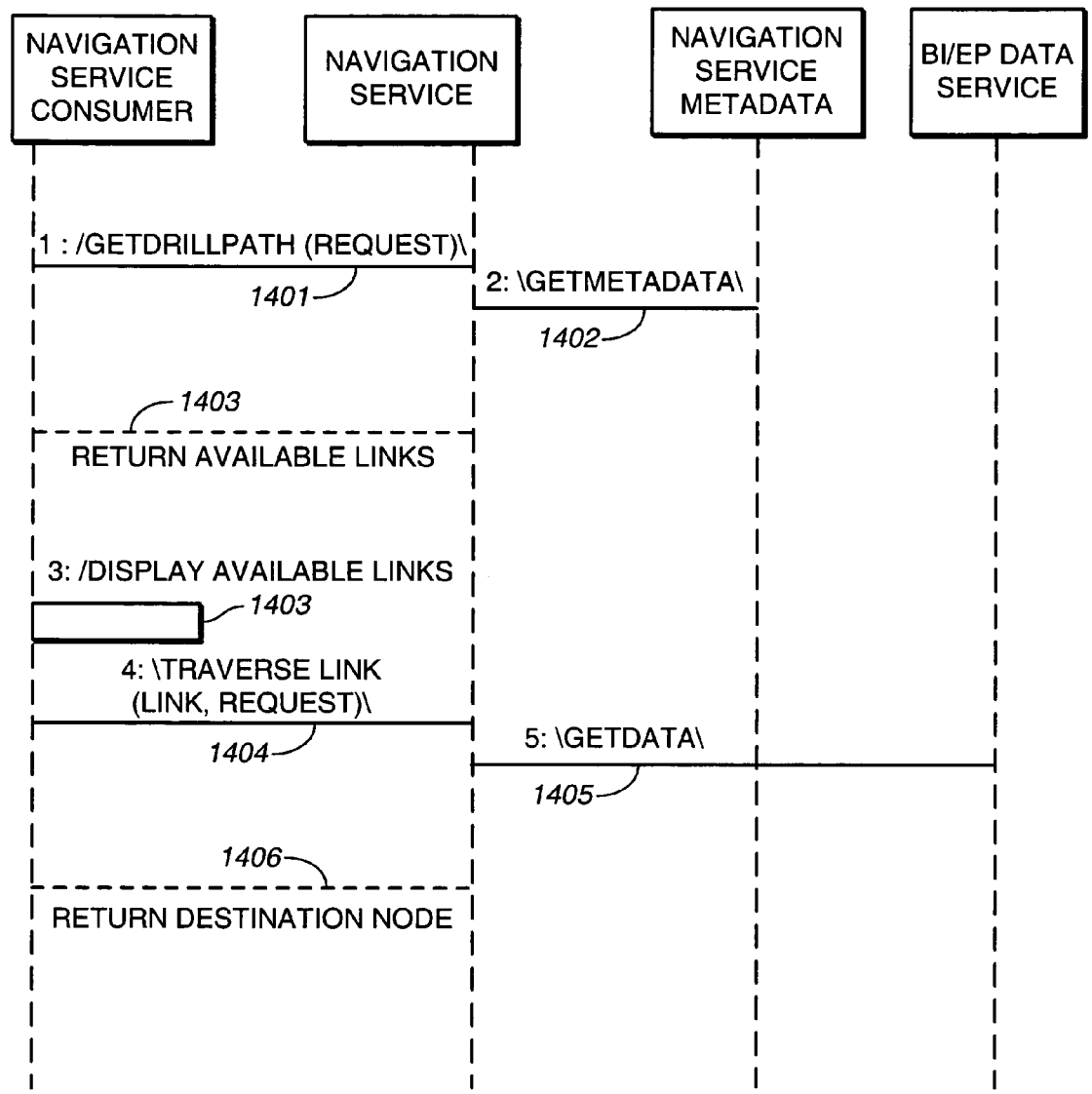
FIG._14

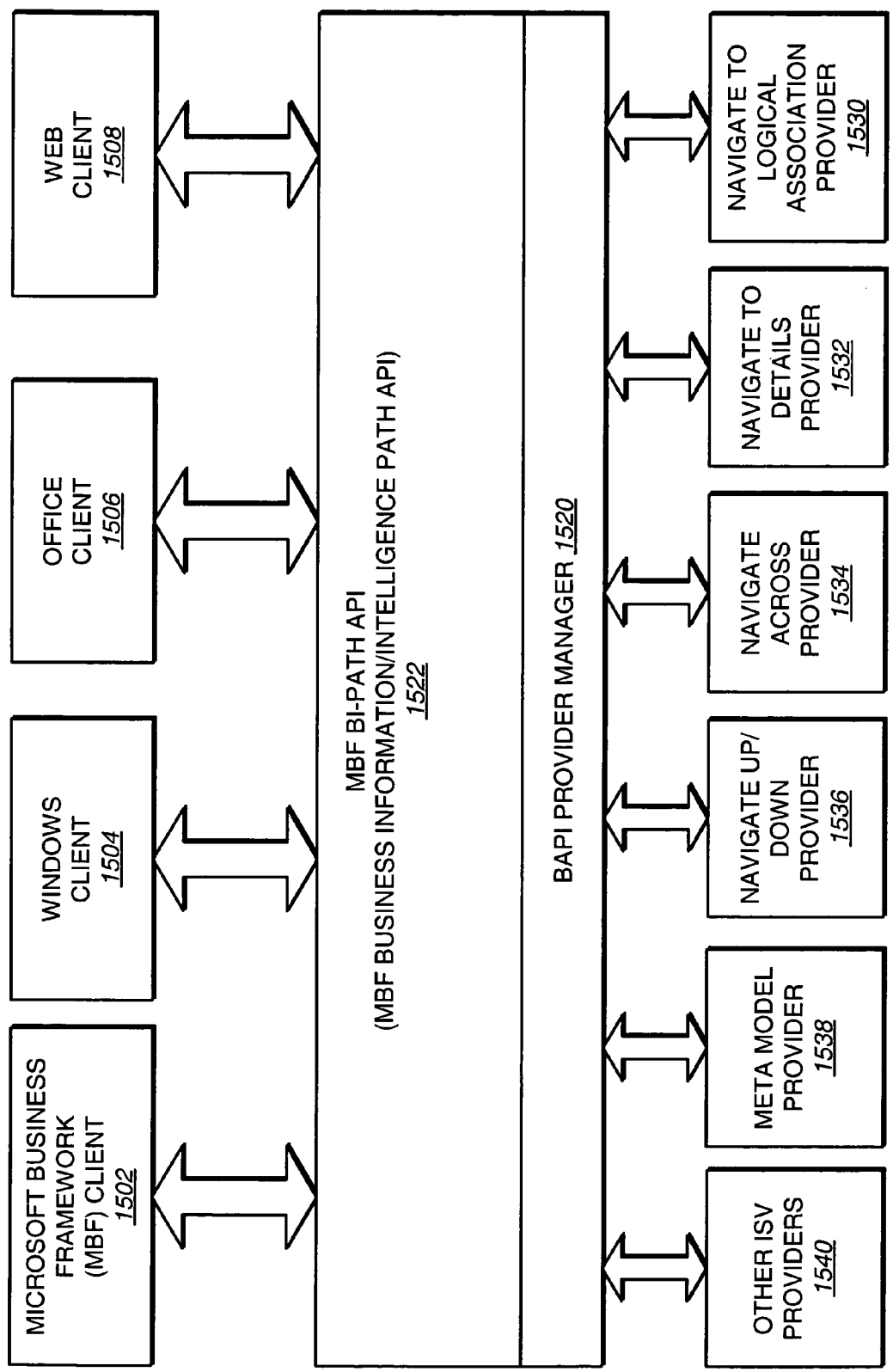
FIG._15

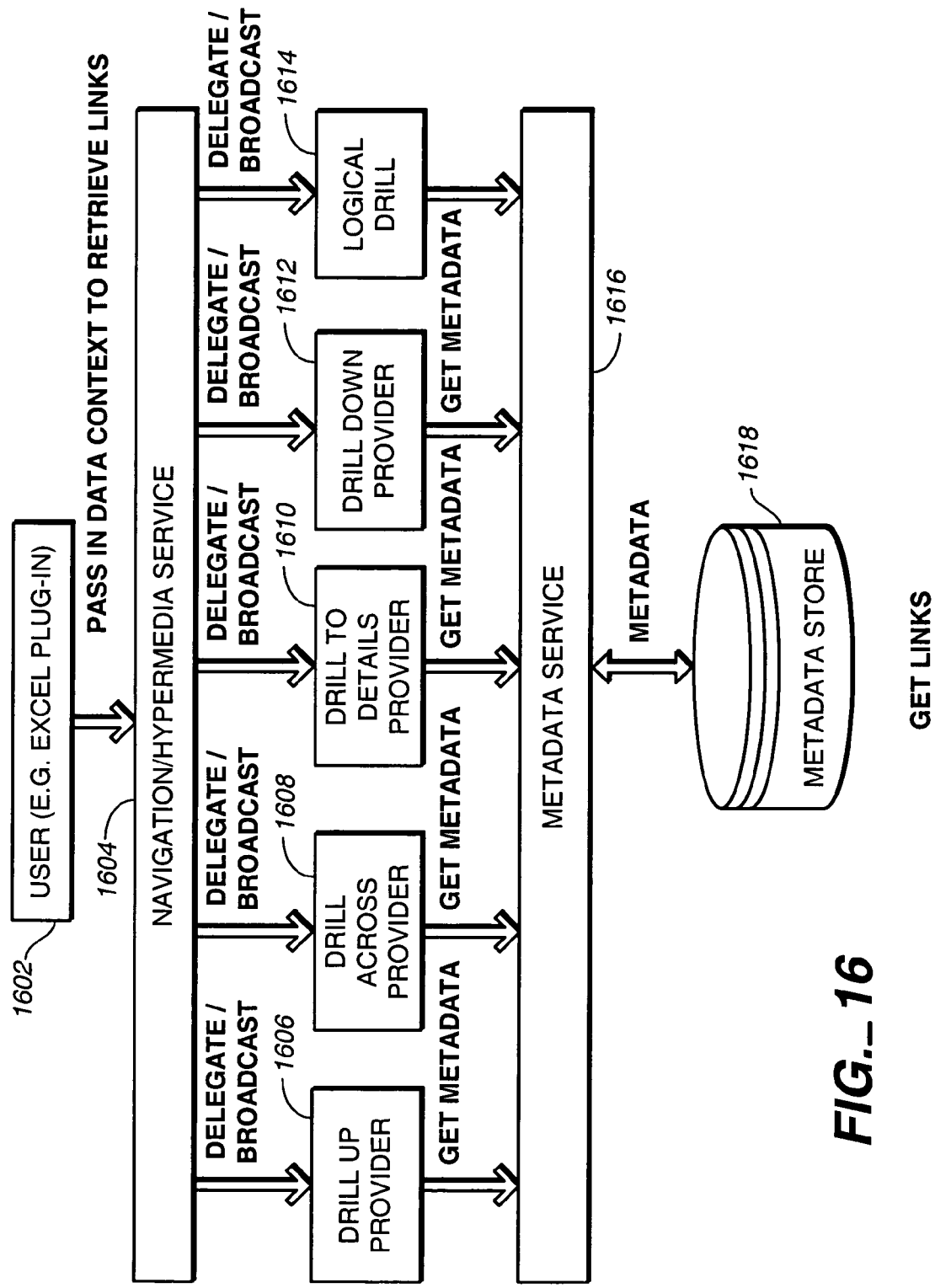
FIG._16

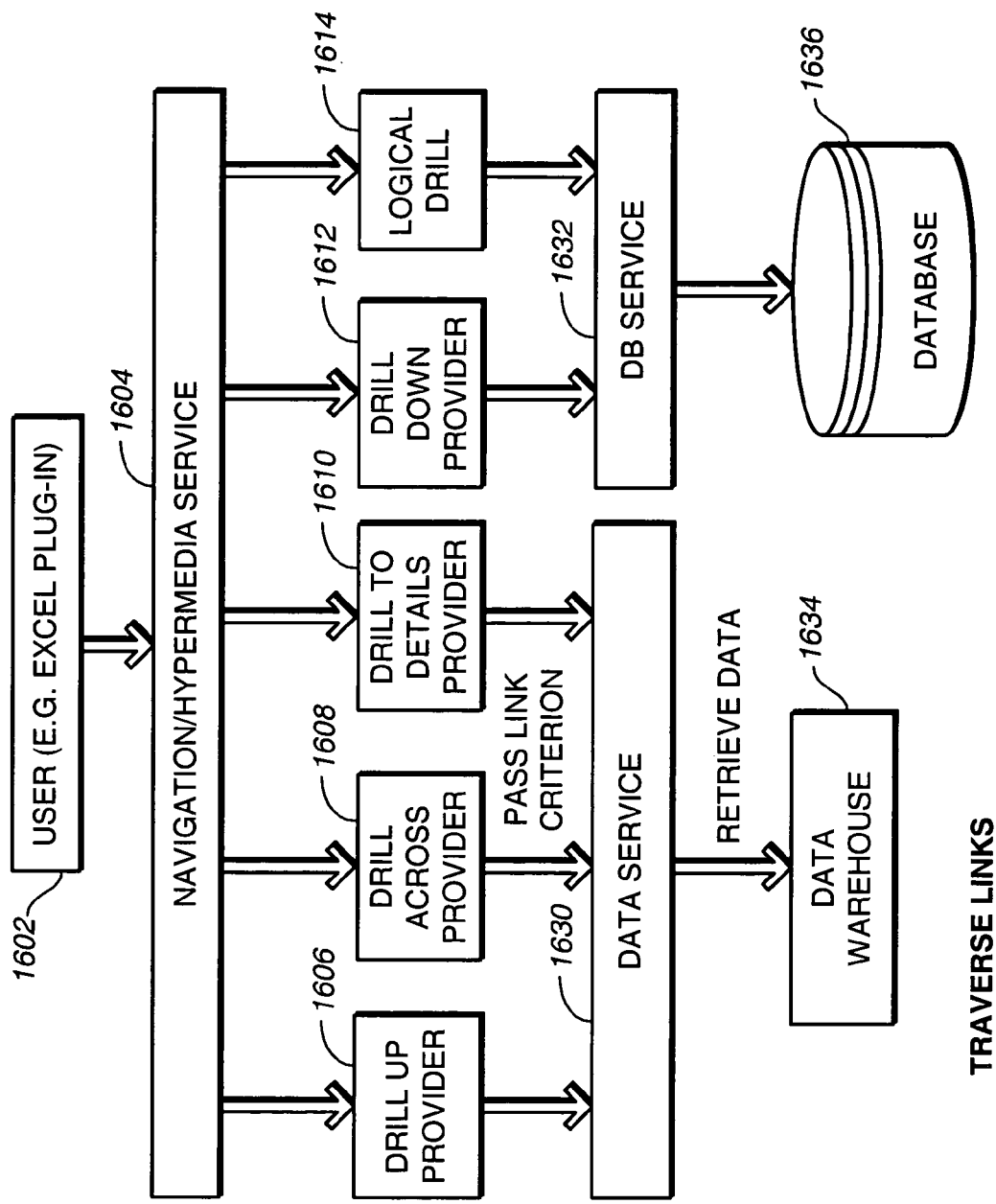
FIG._17

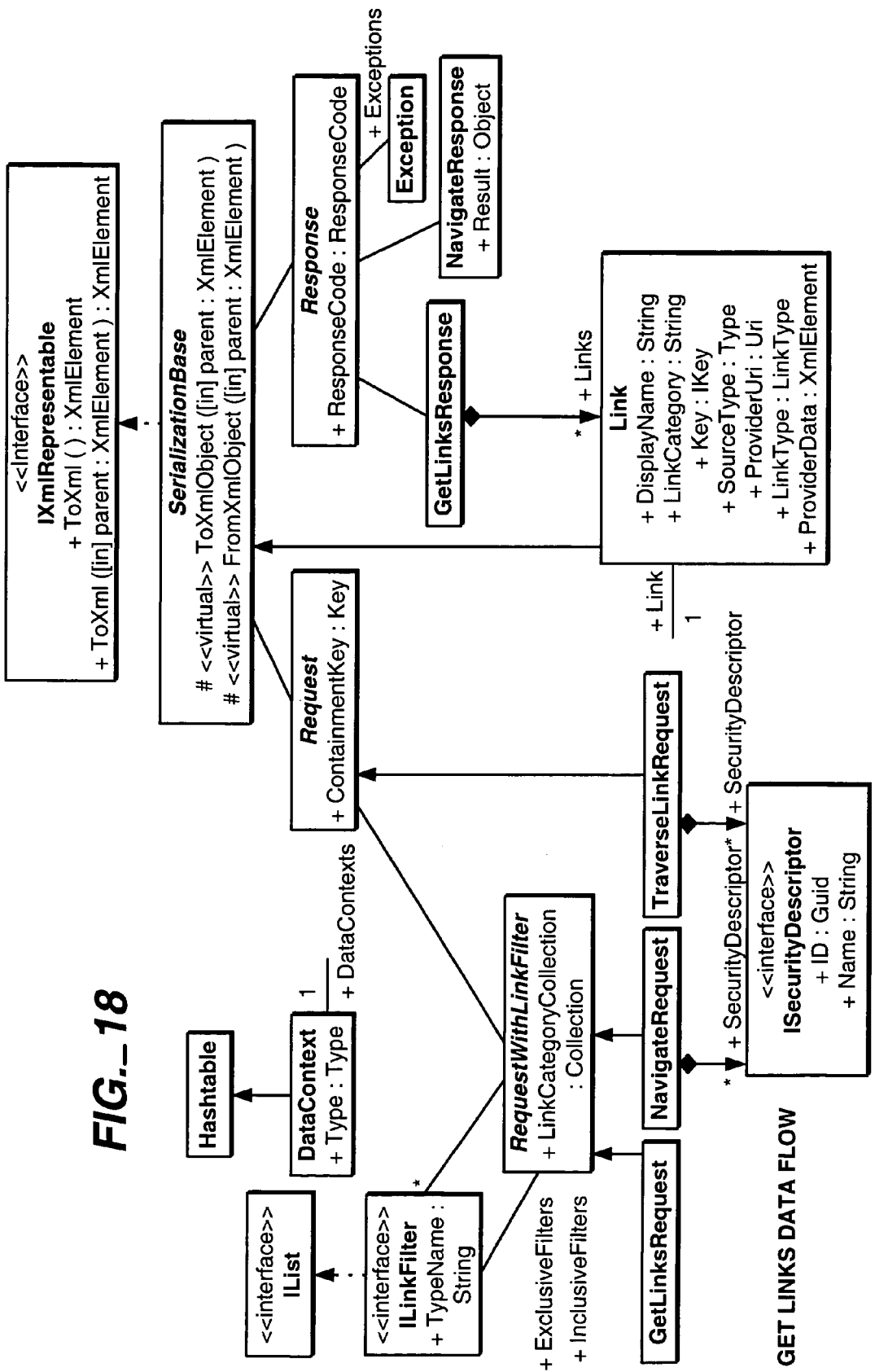
FIG._18
GET LINKS DATA FLOW

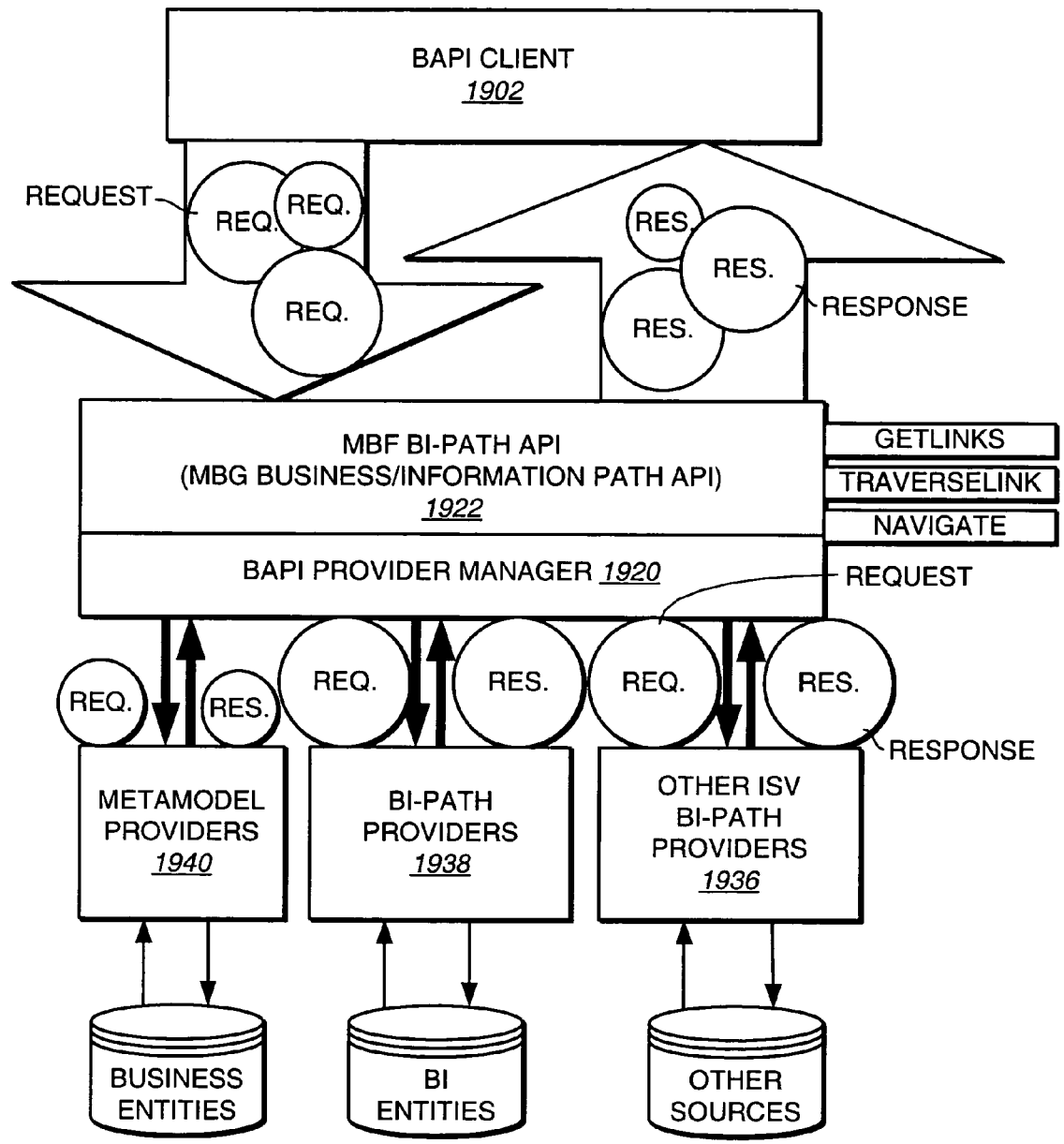
FIG._19

METADATA DRIVEN INTELLIGENT DATA NAVIGATION

BACKGROUND OF THE INVENTION

The present invention relates to data analysis tools provided to a user of a business application. More specifically, the present invention relates to the identification and user-utilization of navigation paths between related data elements.

When designing software applications involving business transactions, application developers conventionally use a model-driven architecture and focus on domain specific knowledge. The model driven architectures often include business objects (or business entities) involved in underlying business transactions, such as business entities corresponding to customers, orders and products. These entities are modeled as objects following the paradigm of object orientation.

Each object encapsulates data and behavior of the business entity. For example, a Customer object contains data such as name, address and other personal information for a customer. The Customer object also contains programming code, for example, to create a new Customer, modify the data of an existing Customer and/or save the Customer to a database.

The object model also enables a description of relationships among modeled business entities. For example, a number of Order objects can be associated with a Customer object representing the customer who makes those orders. This is known as an association relationship. Other types of relationships can also be defined, such as compositions. An Order, for example, can be "composed of" a collection of OrderLines. These OrderLines typically do not exist independently of the Order they belong to.

Application developers apply the business logic associated with the object-relational model to their applications. Data that corresponds to objects in the object-relational model is typically stored in a database. Data is commonly retrieved from the relational database utilizing on-line transaction processing (OLTP).

Business applications designed to operate in association with the described model-driven architecture are often linked to a considerable amount of data. The quantity of data can be overwhelming to a user of such applications such that the user has difficulty in deriving or extracting useful information. The relationships that connect various data sets are not necessarily obvious to a user, and are therefor susceptible to being lost analytical and organizational opportunities.

SUMMARY OF THE INVENTION

The present invention provides a system for enabling a user to extract useful information from a collection of business data. In accordance with one aspect of the invention, the relationships that connect various data elements are analyzed in order to identify intelligent data navigation paths. The intelligent data navigation paths are utilized as a basis for enabling the user to move between related sets of data.

In accordance with one embodiment, to accomplish intelligent navigation of a collection of business data, a user first provides a data context to a navigation service layer. The navigation service layer supplies the data context to a plurality of providers that are each associated with a particular type of data navigation. In light of its particular type of data navigation, each provider analyzes the data context in association with a metadata store that reflects relationships between data elements comprised within the collection of business data. Each provider then supplies the navigation service layer with a list of intelligent navigation links. The navigation service layer submits the received links to the user. To intelligently navigate through the collection of business data, the user traverses a desired link.

BRIEF DESCRIPTION OF THE DRAWINGS

FIG. 1 is a diagrammatic representation of a computing environment.

FIGS. 3-7 are screen shots demonstrating presentations of data in the context of a business application.

FIG. 8 is a diagrammatic representation of a star-oriented data organization schema.

FIGS. 9 and 10 are screen shots demonstrating presentations of data in the context of a business application.

FIG. 11 is a schematic representation demonstrating the origin of navigation paths.

FIGS. 12A and 12B are diagrammatic views demonstrating application of a specialized model services system to generate a dimensional model and Business Intelligence entities.

FIG. 13 is a flow illustration demonstrating generation of BI entitiy metadata for an intelligent navigation service.

FIG. 14 is a flow illustration demonstrating interaction between a navigation service and a user.

FIG. 15 is a block diagram illustrating a navigation service architecture.

FIG. 16 is a combination block-flow diagram illustrating a process of collecting navigation links.

FIG. 17 is a combination block-flow diagram illustrating a process of traversing one particular navigation link.

FIG. 18 is a request/response class diagram that pertains to a process of acquiring links in response to a user request for intelligent data navigation, and to a process of traversing a link selected by the user.

FIG. 19 is a simplified request/response diagram.

DETAILED DESCRIPTION OF ILLUSTRATIVE EMBODIMENTS

I. Illustrative Computing Environments

Figure 2A:
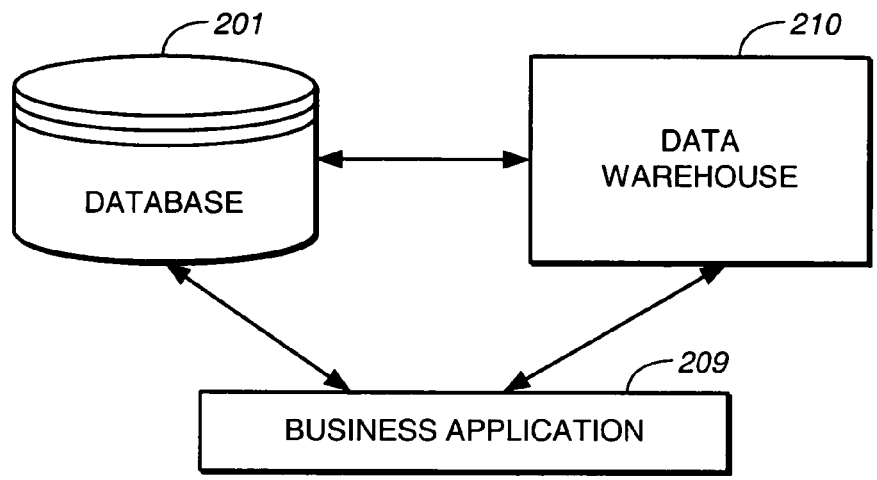
FIG. 2A is a block diagram illustrating a data processing environment for a business application.

Various aspects of the present invention pertain to a system for enabling a user to extract useful information from a collection of business data. However, prior to describing the present invention in greater detail, embodiments of illustrative computing environments in which the present invention can be used will be described.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or. more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

II. Illustrative Data Processing Environments

FIG. 2A is a block diagram illustrating a data processing environment for a business application 209. Within the realm of business applications, there are typically at least two types of data stores. Interaction of business application 209 is illustrated in conjunction with both types, namely, data stores 201 and 210.

The first type of data store depicted in FIG. 2A is database 201. Database 201, which is illustratively a relational database, contains transactional business data in generally non-aggregated form. Database 201 is illustratively configured to recognize on-line transaction processing (OLTP) at least to facilitate the storage and retrieval of data. In accordance with one embodiment, database 201 is an MS SQL Server system as is available from Microsoft Corporation of Redmond, Wash. Other database systems can be incorporated without departing from the scope of the present invention.

The other type of data store depicted in FIG. 2A is data warehouse 210. Data warehouse 210 illustratively contains data from database 201 arranged in a generally aggregated form. Data warehouse 210 may also contain data aggregations derived based on other aggregations or based on data in database 201. The data in data warehouse 210 is generally organized to enhance the performance and speed of data retrieval and processing executed in association with business application 209. The fundamental underlying transaction data, however, is typically retrieved from database 201 as necessary for the performance various functions including aggregation manipulations. At least some of the data in data warehouse 210 is illustratively the same, or directly related to, data in database 201. Data warehouse 210 is illustratively configured to recognize on-line analytical processing (OLAP). In accordance with one embodiment, data warehouse 210 is an MS OLAP Server system as is available from Microsoft Corporation of Redmond, Wash. Other systems can be incorporated without departing from the scope of the present invention.

Figure 2B:
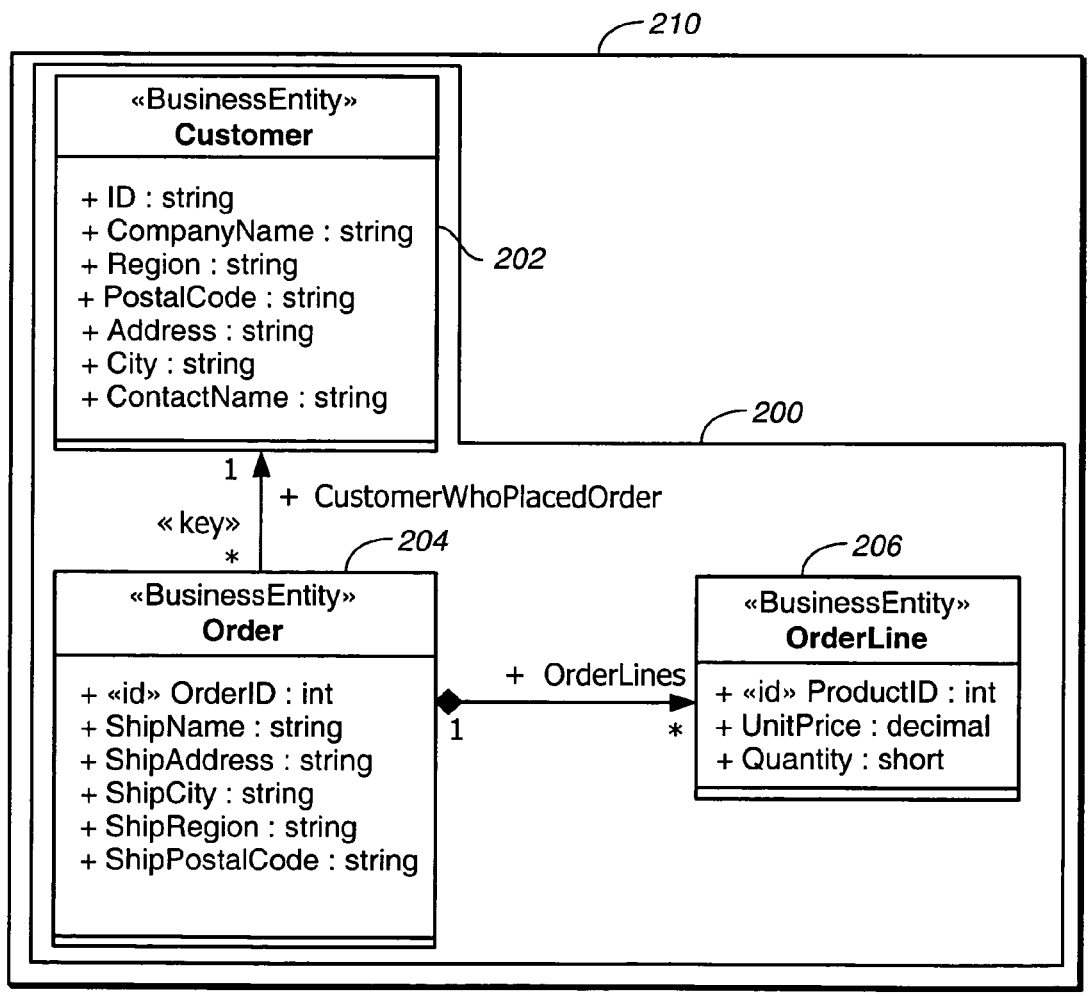
FIG. 2B is a diagrammatic representation of object-oriented organization in association with data store in a data warehouse.

In accordance with one aspect of the present invention, an application developer implements business logic for application use through development of an object-relational (O-R) model. FIG. 2B illustrates an application of business logic in association with data warehouse 210. The application developer has illustratively implemented an O-R model here-to-forth identified as object model 200. Object model 200 includes a plurality of different business entities, including a Customer entity 202, an Order entity 204 and an OrderLine entity 206.

The illustrated object model 200 incorporates notation that is commonly known as unified modeling language (UML). The notation shows a composition relationship between Order 204 and OrderLine 206. Thus, it indicates that the Order entity 204 is composed of one or more OrderLine entities 206. Object model 200 also shows that Order 204 has an association with Customer 202. Transactional data, such as values that correspond to the illustrated field properties for each object, is stored in database 201 and retrieved as necessary. It is to be recognized that object model 200 is a simple example for the purpose of illustration only.

In accordance with one aspect of the present invention, an OLAP model is generated based on the O-R model to create a multi-dimensional data model and/or business intelligence (BI) entities that encapsulate object-to-object relationship information and other metadata. The creation and storage of a multi-dimensional model, BI entities and metadata will be discussed in greater detail below in Section V.

III. Intelligent Data Navigation Paths

Various aspects of the present invention pertain to a system for enabling a user to extract useful information from a collection of business data. The foundation underlying the system is based upon the identification and user-utilization of navigation paths between related data elements. The general nature of five specific navigation paths will now be described in the context of the data processing environments described in relation to FIGS. 2A and 2B. Detailed data relationships that enable these data navigation paths will be described in Section V.

A. The First Data Navigation Path

As was discussed above in relation to FIG. 2A, data warehouse 210 illustratively contains data aggregations corresponding to transaction data stored in database 201. The first data navigation path relates to the process of traversing from an OLAP data element to corresponding transaction data. For the purpose of illustration, this navigation path will here-to-forth be referred to as "drill down" navigation (also can be referred to as "drill through" navigation).

An example will help to describe the nature of a drill down navigation. FIG. 3 is a screen shot demonstrating a presentation of aggregated data (e.g., OLAP data) to a user of a business application. The screen shot shows a graph illustrating the fact that a company's sales for calendar 1996 in the U.S. was $5,949.00. Assuming the user is interested in figuring out all of the U.S. customers that purchased the associated product in 1996, he can illustratively use a drill down navigation. Through a drill down navigation, the user is able to drill down to a customer transaction table. FIG. 4 is an example of a screen shot demonstrating the result of the drill down navigation, which is a customer transaction table showing U.S. customers who purchased the relevant product in calendar 1996.

B. The Second Data Navigation Path

The second data navigation path involves moving from transactional data to an associated aggregated collection of data (e.g., from transactional data to corresponding OLAP data, or from database 201 data to data warehouse 210 data). For the purpose of illustration, this process of moving from transactional data to aggregated data is here-to-forth referred to as "drill up" navigation.

An example will help to describe the nature of a drill up navigation. The customer transaction table illustrated in the screen shot of FIG. 4 is an appropriate starting point for illustrating a drill up navigation. Each customer in the table has illustratively been assigned a city, as well as an ID category. If a user is interested in determining the aggregated total sales order quantity for all customers under the ID category "ALFKI", a drill up navigation can be utilized to produce such information. FIG. 5 is a screen shot illustrating the result of the drill up navigation and shows a graph showing that the sales order quantity for the customer ID "ALFKI" is 225.58.

C. The Third Data Navigation Path

It is common for the data in data warehouse 210 to be aggregated into a hierarchical scheme. For example, the following scheme is typical of organization within the data warehouse:

```
                CUSTOMER
                 -->LOCATION
                    -->Region
                       -->City
                          -->Customer Name
```

Accordingly, an example set of data warehouse data is orgainized as follows:

```
                CUSTOMER
                 -->LOCATION
                    -->Northwest
                       -->Seattle
                          -->Boeing
                       -->Portland
                          -->Starbucks
                    -->Midwest
                       -->Minneapolis
                          -->Target
```

Hierarchical schemes are utilized within the data warehouse because they are a relatively natural way to organize data. Given such organization, it becomes relatively simple to query data based on obvious aggregation patterns. For example, in accordance with the above example scheme, a user could easily query to find out what customers are in Portland, or to find out what customers are located in the Northwest, etc.

The third data navigation path involves moving through collections of data that are hierarchically organized. For the purpose of illustration, the third data navigation path will here-to-forward be referred to as "drill to detail" navigation. A drill to detail navigation enables a user to move through certain levels of data based on inherent hierarchial organization.

An example will bring light to the nature of a drill to detail navigation. FIG. 6 is an example of a screen shot that provides aggregated information (e.g., data warehouse 210 data) to a user of a business application. The screen shot includes a chart showing that U.S. sales for a company in calendar 1997 was $15,072.00. Assuming the user wants to see the monthly sales for calendar 1997, he/she can perform a drill to detail navigation. In other words, he/she can drill to the monthly sales for 1997. The ability to move between data sets in this manner is illustratively suported by the hierarchical organization of data warehouse 210. FIG. 7 is a screen shot example showing a graph that represents monthly sales for 1997. The user is illustratively able to drill from the FIG. 6 aggregation to the narrower FIG. 7 aggregation.

D. The Fourth Data Navigation Path

It is possible for data, such as data in data warehouse 210, to be organized in association with a framework that includes a multi-dimensional star-oriented schema, a simple example of which is illustrated in FIG. 8. Within FIG. 8, Sale 800 is associated with two dimensions, namely, customer 801 and product 802. Shipment 810 is associated with the same two dimensions. It should be noted that Sale 800 could just as easily be associated with dimensions that are different than the dimensions of Product 810. In accordance with one embodiment, Sale 800 and Shipment 810 are each independent object entities, similar to those described in relation to FIG. 2B. In accordance with another embodiment, however, Sale 800 and Shipment 810 are independent data warehouses.

When dimensions are shared as they are in FIG. 8, the stage is set for the fourth data navigation path. For the purpose of illustration, the fourth data navigation path will here-to-forward be referred to as "drill across" navigation. With a drill across navigation, a user is able to navigate from a first object (or data warehouse) to an object (or data warehouse) that is similarly situated in terms of having a related dimension. For example, with reference to FIG. 8, if a user is looking at a collection of data related to Sale 800, he/she can drill across and view data pertaining to Product 810. A drill across navigation enables the user to switch between sets of inherently related data.

An example will help shed light on the nature of a drill across navigation. FIG. 9 is an illustration of a sample screen shot that contains a portion of a graph that is viewed by a user of a business application. The graph generally presents sales information. More specifically, the graph presents sales order quantity to product relationship data for a company. To simplify the illustration, only a few rows of the graph are shown. A complete graph will include additional rows. It is assumed that the data organization scheme supporting the graph includes a sales data warehouse and a product data warehouse that share the same dimension, namely a product dimension. Accordingly, assuming the user is interested in determining a stock value for a product underlying the graph of FIG. 9, he/she can drill across from the FIG. 9 graph to view stock value information. FIG. 10 is an example of a screen shot having a graph containing a stock value for a product.

In accordance with one aspect of the present invention, the described fourth navigation path is based on an analysis of a data organizatin scheme called a dimensional model, or based on an analysis of a data organization scheme called a BI entity model. The generation of dimensional and BI entity models will be described below in greater detail in relation to FIGS. 12A and 12B. Suffice it to now say that it is common for a dimensional and BI entity models to be organized into a series of facts (e.g., sales, product, etc.) that are associated with one or more dimensions (e.g., customer, product, etc.), similar to the organization scheme described in relation to FIG. 8. In accordance with one aspect of the present invention, a fact-to-fact drill across navigation is available in instances where dimensions are shared.

E. The Fifth Data Navigation Path

The fifth data navigation path is called an ad hoc logic association navigation, here-to-forth referred to as a "logic association" navigation. This navigation path is essentially a user-defined shortcut between two sets of related data. In one embodiment, a user applies his/her business knowledge to identify properties within a first data collection that are related to properties in a second data collection. The related properties are then utilized as the basis for a data navigation path between the first and second collections of data.

An example will help to describe the fifth navigation path. A user illustratively creates a "Customer" object within a data warehouse 210 (FIG. 2A). The same user also illustratively creates a "Customer-Related-Information" object. It is assumed that the user has a fundamental understanding of his/her business. In accordance with the fifth navigation path, the user applies his/her business knowledge to identify a property within the Customer object that is related to a property in the Customer-Related-Information object. The user is allowed to identify the related property relationship ad hoc at run time to enable data navigation between their associated objects. As opposed to the previously described four data navigation paths, the fifth path is generally not based on an underlying physical relationship, but instead is based on a user's understanding of his/her business.

IV. Identifying the Data Navigation Paths

In accordance with one aspect of the present invention, a metadata store is created to catalog relationships between data elements. The above-described data navigation paths are illustratively defined and implemented through analysis of the relationship data in the metadata store.

FIG. 11 is a schematic diagram showing the input of data relationship information 1101 into a metadata store 1100. Navigation service 1104 then analyzes information in metadata store 1100 in order to identify certain data relationships that become the basis for implementation of navigation paths 1102. The nature of the services provided by service 1104, as well as an illustrative underlying architecture, will be described below in in detail in relation to other Figures. Suffice it to now say that the data relationships underlying navigation paths 1102 satisfy criteria applied by navigation service 1104 (e.g., criteria are created at runtime based on metadata in the metadata store and current data context input). Navigation paths 1102 are illustratively provided to a user of a business application in some form (e.g., a set of links) to enable intelligent data navigation. The user can illustratively utilize the automatically generated navigation paths to navigate through data in order to improve his/her understanding of data, to analyze data, to make projections, to make informed decisions, etc.

In accordance with one embodiment, the analysis of metadata store 1100 and the identification of navigation paths are performed at run time. Accordingly, with the possible exception of input required for logic association navigations, user knowledge is generally not required to enable utilization of the navigation paths. The navigation paths are identified and provided to the user simply based on data relationships reflected in the data processing system.

V. Population of the Metadata Store

Population of metadata store 1100 with data relationship information 1101 will now be described in greater detail. It should be noted, however, that the specific type of relationship data stored within metadata store 1100 can be customized to support a particular navigation path. For example, it is within the scope of the present invention to develop a new navigation path and configure the system to store corresponding relationship data within metadata store 1100, if such data is not already being stored. For the purpose of illustration, examples of relationship data that is stored within metadata store 1100 to support the above-described and other data navigation paths will be described in detail.

A. Relationship Data From O-R Model

It is common for data warehouse 210 (FIG. 2A) to be organized in accordance with a framework that enables a user to define objects and relationships. An example of such a framework was illustrated and described in relation to FIG. 2B. In accordance with one aspect of the present invention, at least some of the relationships underlying the object-relational framework represent potential navigation paths, and are therefore utilized to populate metadata store 1100. For example, based on a UML object diagram, the relationships between objects (e.g, associations and compositions) represent potential navigation paths and are therefore illustratively identified and cataloged in metadata store 1100. Other known object relationships, such as inheritance relationships, also represent potential navigation paths and are therefore also illustratively cataloged in metadata store 1100.

B. Relationship Data From Other Sources

In accordance with one embodiment, relationship data representing potential navigation paths is captured from the process of creating derivative informational models based at least in part on an object-relational model.

FIG. 12A illustrates a specialized model services system 1250 that takes, as inputs, a specification of focal points 1252, an object description 1254 and a set of persistent data store mappings 1256. System 1250 then produces a dimensional model 1258 based on the inputs. FIG. 12A also illustrates an entity generator 1260 that generates a set of object (or entities), referred to herein as business intelligence entities (or BI entities) 1262, based on the dimensional model 1258.

Focal points 1252 represent certain data in the object model that is marked by the user as being a focal point of analysis. Object description 1254 is an input which describes the object orientation relationships corresponding to a set of objects. This can take the form of, for example, a UML class diagram. Persistent data store mappings 1256, which illustratively take the form of a map file, map the data referred to by the object model to the persistent data store (e.g., database 201 shown in FIG. 2A).

FIG. 12B illustrates the system shown in FIG. 12A, but in greater detail. In the example illustrated in FIG. 12B, the object model (e.g., object model 200 in FIG. 2B) is represented by object description 1254, and the mappings 1256 are shown between the object model representation 1254 and the database representation 1264 (e.g., data in database 201 in FIG. 2A). FIG. 12B also shows Dimensional model 1258 in greater detail. Dimensional model 1258 includes a Fact table 1266 along with a plurality of dimensions 1268 and 1270 (the Customer dimension and the Order dimension). Each dimension is formed of one or more tables. The dimensional model incorporates a star-oriented schema similar to that shown in FIG. 8. FIG. 12B also illustrates one embodiment of a set of BI entities 1262. In the example shown in FIG. 12B, the BI entities 1262 include a BIOrderFact entity 1270, a BIOrder entity 1272 and a BICustomer entity 1274. Entities 1272 and 1274 are related to entity 1270. It should be noted that FIG. 12B is a relatively simple example provided for the purpose of illustration.

In accordance with one aspect of the present invention, some of the data relationships 1101 stored in metadata store 1100 are related to mappings 1256, dimensional model 1258 and/or BI entity object model 1262.

Through model services 1250 and BI entity generator 1260, an object model is translated into a BI entity object model, which can also be referred to as a data warehouse object model. Generally speaking, the translation involves a transition from an OLTP UML object model to a multi-dimensional OLAP data warehouse object model. In accordance with one embodiment, relational mappings of the transition from the regular object model to the BI entity object model represent potential navigation paths, and are therefore added to metadata store 1100. For reference, the regular object model objects can be referred to as business entities, while the objects associated with the OLAP data warehouse object model can be referred to as BI entities.

The mappings between the business entities and the BI entities are illustratively saved to metadata store 1100. The mappings ultimately enable report navigation between the OLAP and OLTP domains. Also, navigation paths between BI entities are enabled for report navigation, including the ability to look across BI entities and to review transaction data associated with a BI entity.

FIG. 13 is a flow illustration demonstrating generation of BI entity metadata for the described intelligent navigation services. First, in accordance with step 1301, model service system 1250 (FIGS. 12A and 12B) generates BI entities. Next, in accordance with step 1302, metadata 1304 is created based on the BI entities for the navigation service.

C. Relationship-NavPath Correlations

Exemplary correlations between specific data relationships and navigation paths will now be described, however, the present invention is not limited to the described examples.

In accordance with one aspect of the present invention, drill up and drill down navigation paths are derived based on the relationships between BI entities and their corresponding business entities. As has been described, the mappings generated during the generation of BI entities are cataloged to the metadata store. These mappings are illustratively the foundation that enables drill up and drill down navigations.

In accordance with another aspect of the present invention, model service system 1250 is configured to identify the manner in which two UML models are related, and to generate shared dimensions for corresponding dimensional model cubes. Then, BI entities become the natural reflection of the star-oriented model, wherein for each dimension there will be generated one non-primary BI entity. To enable drill across navigation paths, the mappings between non-primary BI entities and their corresponding dimensions are illustratively cataloged to the metadata store. The relationships between BI entities are also identified. Accordingly, when two BI entities refer to the same shared dimension, a drill across is possible.

In accordance with another aspect of the present invention, to enable the foundation for drill to detail navigation paths, hierarchical relationships are cataloged to the metadata store when the BI entity model 1272 is generated from the UML model 1254 by model service 1250.

VI. Navigation Service Architecture

With reference to FIG. 11 it was described that navigation service 1104 analyzes the data in metadata store 1100 in order to identify and implement navigation paths 1102. In accordance with additional aspects of the present invention, illustrative architectural characteristics and functional methodology will now be described with regard to navigation service 1104.

FIG. 14, in accordance with one aspect of the present invention, is a flow illustration demonstrating interaction between the navigation service (e.g., service 1104 in FIG. 11) and a user of the services provided. As is illustrated by step 1401, the process begins when the user transmits a request for data navigation to the navigation service. As is indicated by step 1402, the navigation service responds to the request by reviewing metadata (e.g., metadata stored in store 1100 in FIG. 11). In accordance with one embodiment, the user provides a data context to the navigation service in step 1401. The data context is the starting point for data analysis, such as the current data set being reviewed by the user. The navigation service illustratively reviews metadata based on the received data context to determine what data navigation paths are available to the user based on his/her data context starting point.

In accordance with step 1403, the navigation service provides a plurality of links to the user. The links, which are displayed to the user, represent data navigation paths that are available for execution. The links are identified based on the review of the metadata. As is represented by step 1404, the user selects a link and communicates the selection to the navigation service. In accordance with step 1405, the navigation service retrieves data corresponding to the user's selection. Finally, in accordance with step 1406, the result of the navigation is returned to the user, thereby providing him/her with the desired data set.

FIG. 15, in accordance with one aspect of the present invention, is a block diagram illustrating a navigation service architecture. The architecture includes, but is not limited to, a plurality of illustrated clients 1502, 1504, 1506 and 1508.

Examples of the clients are now discussed, but these are examples only and do not limit the scope of the invention. Client 1502 is illustratively a client based in the Microsoft Business Framework (MBF) but could be any other framework as well. The Microsoft Business Framework is a set of developer tools and software classes offered by Microsoft Corporation of Redmond, Wash. Client 1504 is illustratively a client based in Windows, an operating system offered by Microsoft Corporation, but could be based on any other operating system as well. Client 1506 is illustratively based in Microsoft Office, a software package offered by Microsoft Corporation, but could be based on any other software package as well. Client 1508 is a more generic identifier representing a web-based client.

In accordance with one embodiment, at least one of the illustrated clients are BAPI clients in that they are configured to support object-oriented programming via an interface defined in terms of objects and method based in what is known as the Business Application Program Interface (BAPI). In other words, a BAPI client application navigates information using BAPI. To support the BAPI clients, the illustrated architecture includes a BAPI provider manager and an MBF BIPath API 1522.

Provider manager 1520 is illustratively configured to operate in conjunction with a plurality of providers. A few specific providers, to which the present invention is not limited, are illustrated in FIG. 15. Providers 1536, 1534, 1532 and 1530 are configured to support different types of navigation, such as navigation based on analysis of BI Entity data, as described herein. Provider 1538 illustratively provides navigation via analysis of metamodel data. Provider 1540 is a generic block indicating other providers that the architecture can easily be extended to support (e.g., navigation based on other sources). At least one provider is illustratively a BAPI provider configured to operate in conjunction with the other BAPI components of the architecture.

In accordance with one aspect of the present invention, one of the BAPI clients sends a navigation Request to BAPI provider manager 1520 through BAPI. The BAPI provider manager then either delegates the Request to a set of specific providers or broadcasts to all providers. The BAPI provider manager 1520 then aggregates results returned from different providers and sends them back to the requesting BAPI client.

In accordance with one embodiment, when a new BAPI provider is implemented, it will implement the BAPI API and extend the Request/Response objects if necessary to provide additional functionality. The new BAPI provider will then be plugged into the BAPI provider manager 1520 and make itself available for requests. After this, the BAPI client will be able to request the service from the new BAPI provider to obtain any additional offered functionality.

Accordingly, a BAPI client includes an application that navigates information using BAPI. The BAPI, which will illustratively be exposed, is the principle interface implemented by a BAPI provider. A BAPI providers is an implementation of BAPI API: a BAPI client navigates to obtain a different information perspective via a BAPI provider. The framework can then be extended through implementation of future/other providers through the similar Request/Response object exchange format. There therefor can be type specific BAPI providers (Hypermedia providers, BIPath providers, etc.). This can be done through implementation of BAPI in a provider specific manner to support custom Request/Response objects. The BAPI provider plugs itself into the BAPI provider manager and is used by the BAPI client in a delegation (if type is specified)/broadcasting pattern.

It should be emphasized that the client systems involved can be web services or non-web services. The submitted Requests illustratively, although not necessarily, include a data context used by a provider in the creation of a Response. In accordance with one embodiment, certain providers are associated with their own particular type of data navigation path. For its type of path, the navigation provider is configured to identify corresponding navigation paths based on a received Request.

In accordance with one embodiment, when a new type of data navigation path is desired, a corresponding new provider is simply registered and integrated. Accordingly, any entity can illustratively develop a navigation path provider to expand on the types of navigations available to client users. In other words, the provider layer is essentially plug-and-play with the service layer to enable relatively simple extensions of service functionality.

Within FIG. 19, the providers are generically listed as providers 1940 (e.g., providers that provide navigation paths based on business entity information), providers 1930 (e.g., providers that provide navigation paths based on BI Entity information), and providers 1936 (e.g., other ISV providers including providers that provide navigation paths based on "other" sources).

Within FIG. 19, the providers are generically listes as providers 1940 (e.g., providers that provide navigation paths based on business entity information), providers 1930 (e.g., providers that provide navigation paths based on BI Entity information ), and providers 1936 (e.g., other ISV providers including providers that provider navigation paths based on "other" sources).

As is illustrated, requests are delegated (or broadcast) to providers 1940, 1938 and 1936, which respond with a response. In accordance with block 1906, the responses are then provided to BAPI client 1902 in an aggregated form (aggregation is optional). In accordance with one embodiment, the responses are provided to client 1902 in the form of a collection of links. A link is selected by a user of the client and a corresponding "TraverseLink( )" command is sent to API 1922. A corresponding navigation command is then sent to one or more providers so as to produce a data result, which is provided to client 1902.

It should be emphasized that the Request/Response objects can be extended by users. For example, each provider is configured to generate potentially different Requests/Responses (e.g., exemplified in FIG. 19 by the different sizes of response circles).

As was described above in relation to FIG. 14, the process of intelligent data navigation includes generation of a plurality of data navigation links available for a data context received from the user. FIG. 16, in accordance with one aspect of the present invention, is a combination block-flow diagram illustrating the process of collecting available navigation links in association with the described system archetecture.

The process illustratively begins when a user 1602 interacts with a data navigation program (e.g., a plug-in navigation application implemented within a main application such as Microsoft Exel). Through the interaction, the user illustratively passes to a navigation service 1604 a data context and request for navigation links. Navigation service 1604 illustratively delegates (or broadcasts) a request for links to each of a plurality of navigation providers 1606-1614. Each navigation provider 1606-1614 is illustratively configured to support a different type of data navigation path. Each navigation provider interacts with metadata service 1616 to review information within metadata store 1618 (e.g., store 1100 in FIG. 11) based on the data context provided by the user to service 1604 to identify navigation paths of its own respective type. Each navigation provider 1606-1614 then returns a list of links to service 1604, the list of links corresponding to navigation paths available for the provider's respective navigation type. Service 1604 illustratively aggregates all available navigation links and provides them to the user 1602.

In accordance with one aspect of the present invention, as has been alluded to, as opposed to delegating a request for links to a suitable navigation provider, the request can instead be broadcast to multiple providers. In accordance with one embodiment, no navigation type is specified by a client in a broadcast request object. The clients do not specify a type so that the request will be broadcast to multiple providers (e.g., all registered providers). The providers that know about the request will illustratively respond while other providers will not. This is different than the "delegating" scenario.

As was described above in relation to FIG. 14, the described process of intelligent data navigation also includes a user executing or traversing one particular link from the received aggretated list of links. FIG. 17, in accordance with one aspect of the present invention, is a combination block-flow diagram illustrating the process of traversing one particular navigation link in association with the described system architecture.

The FIG. 17 process begins with user 1602 selecting one of the available navigation links returned in response to his/her request for navigation. The selected link is provided to the navigation provider 1606-1614 to which it corresponds. In the illustrated example, the link is provided to drill across provider 1608. The provider that receives the link passes criterion related to the link to either data service 1630 or database service 1632. Service 1630 serves providers that will provide data warehouse (e.g., data warehouse 210) information to the user, while service 1632 services providers that will provide database (e.g., database 201) information to the user. Based on the received criterion, service 1630 or 1632 will interact with either data warehouse 1634 or database 1636, respectively, to obtain the information that corresponds to the navigation destination associated with the link. The information, which is illustratively the executed navigation, is provided to user 1602 through service layer 1604.

VII. Serialized or XML Interfaces

In accordance with one aspect of the present invention, the metadata in the metadata store (e.g., store 1100 in FIG. 11) is maintained in an XML format.

In accordance with one embodiment, the interface with which navigation providers interact to provide the described intelligent navigation capability can illustratively be described as follows:

---

<<interface>>
Navigation Service Provider

---

+GetProviderInfo ([in]providerInfoRequest:XmlElement):XmlElement
+GetDrillPath ([in]DrillPathRequest:XmlElement):XmlElement -continued

| <<interface>> |
| --- |
| Navigation Service Provider |
| +TraverseLink([in]TraversReuest:XmlElement):XmlElement<br>+Navigate (NavigateRequest : XmlElement) : XmlElement<br>. . . |

Finally, in accordance with one aspect of the present invention, FIG. 18 is an exemplary request/response class diagram that pertains to the processes associated with acquiring links in response to a user request for intelligent data navigation, and to the process of traversing one of the links selected by the user. As is illustrated, the processes are routed through a serialization base associated with an XML interface. It should be noted that the configuration of FIG. 18 is but one example of a system that is suitable to support the described intelligent navigation capabilities.

VIII. Exemplary Code

In accordance with one aspect of the present invention, following are a listing of code snippets that illustrate an implementation of the described extensible system.

The first code snippet (a) describes in code an example process of acquiring a listing of navigation links, and then traversing a navigation link. Comments denoted within the code snippet with "//" explain the functionality of each line of code.

| a. Get Links and Traverse Link |
| --- |
| ```
//init INavigateProxy
INavigateProxy navigateProxy= . . .;
//create get links request
GetLinksRequest getLinksRequest = new GetLinksRequest( );
//set containment key
getLinksRequest.ContainmentKey = . . .;
//add data context
getLinksRequest.DataContext.Add("Microsoft.EntityTests.Customer.CustomerID", 01963656");
//create a link filter
getLinksRequest.InclusiveFilters.Add(typeof(Microsoft.EntityTests.Sales), "TurnOver", "Profit") ;
//set link categories
getLinksRequest.LinkCategoryCollection.Add("Microsoft.BusinessFramework.IntelliDrill.DrillUp");
//send get links request
GetLinksResponse getLinksReponse = navigateProxy.GetLinks(getLinksRequest);
//traverse the link if a link is returned
TraverseLinkRequest traverseLinkRequest = new TraverseLinkRequest( );
traverseLinkRequest.Link = getLinksReponse.Links[0];
traverseLinkRequest.ContainmentKey = . . .;
traverseLinkRequest.SecurityDescriptor = . . .;
//send traverse link request
NavigateResponse navigateResponse = navigateProxy.TraverseLink(traverseLinkRequest);
//get dataset back
DataSet dataset = (DataSet) navigateResponse.Result;
``` |

The code snippet listed in part (a) assumes a scenario wherein, in response to a Request, a user is provided with a plurality of links. In accordance with one embodiment, the user simply asks for a link (or a type of link) and is directly provided a result. In essence, the GetLinks and TraverseLink processes are combined into a consolidated function. This consolidated function is illustratively called a Navigate function. Snippet (b) described a Navigate function.

| b. Navigate |
| --- |
| ```
//init INavigateProxy
INavigateProxy navigateProxy= . . .;
//create navigate request
NavigateRequest navigateRequest = new NavigateRequest( );
//set containment key
navigateRequest.ContainmentKey = . . .;
//add data context
navigateRequest.DataContext.Add("Microsoft.EntityTests.Customer.CustomerID", "01963656");
//create a link filter
navigateRequest.InclusiveFilters.Add(typeof(Microsoft.EntityTests.Sales), "TurnOver", "Profiit")
//set link categories
navigateRequest.LinkCategoryCollection.Add("Microsoft.BusinessFramework.IntelliDrill.DrillUp");
//set security descriptor
navigateRequest.SecurityDescriptor = . . .;
NavigateResponse navigateResponse = navigateProxy.Navigate(navigateRequest);
//get dataset back
DataSet dataset = (DataSet) navigateResponse.Result;
``` |

In accordance with one aspect of the present invention, in order to support new providers, a flexible architecture is provided wherein Request/Response objects are extensible. For example, a user can define tailored instances of GetLinks and other elements so as to extend the base class for new providers. Snippet (c) demonstrates the flexible architecture.

---
c. Request/Response Extensibility
---
```
Note: Request/Response Extensibility can illustratively
be implemented by either
extending the base class or using property bag.
public class MyGetLinksRequest : GetLinksRequest
{
public MyGetLinksRequest(XmlElement request) : base(request) { ... }
public String MyProperty { ... }
}
public class MyTraverseLinkRequest : TraverseLinkRequest
{
...
}
public class MyNavigateRequest : NavigateRequest
{
...
}
public class MyNavigateResponse : NavigateResponse
{
...
}
```
---

In accordance with one aspect of the present invention, the extensible architecture extends to provider functionality. Snippet (d) is an example.

---
d. Provider Extensibility
---
```
public class MyNavigateProvider : INavigateProvider
{
public XmlElement GetLinks(XmlElement request)
{
//get object model from xml element
MyGetLinksRequest getLinksRequest =
new MyGetLinksRequest(request);
//do whatever with the request object
...
}
public XmlElement GetLinks(XmlElement request)
{
...
}
public XmlElement GetLinks(XmlElement request)
{
...
}
public String LinkCategory
{
Get
{
return "Microsoft.BusinessFramework.IntelliDrill.MyDrillType";
}
}
}
```
---

Snippet (e), in accordance with one aspect of the present invention, demonstrates how the extended architecture is implemented within the original system to enable extended functionality for new providers.

---
e. Extensibility usage
---
```
//init INavigateProxy
INavigateProxy navigateProxy= ...;
//create get links request
MyGetLinksRequest getLinksRequest = new MyGetLinksRequest( );
//set containment key
getLinksRequest.ContainmentKey = ...;
//add data context
getLinksRequest.DataContext.Add("Microsoft.EntityTests.Customer.CustomerID", "01963656");
//create a link filter
getLinksRequest.InclusiveFilters.Add(typeof(Microsoft.EntityTests.Sales), "TurnOver", "Profit") ;
//set link categories
getLinksRequest.LinkCategoryCollection.Add("Microsoft.BusinessFramework.IntelliDrill.
MyDrillType");
//set property for the extended request
getLinksRequest.MyProperty = ...;
//send get links request
GetLinksResponse getLinksReponse = navigateProxy.GetLinks(getLinksRequest);
```
---

Although the present invention has been described with reference to particular embodiments, workers skilled in the art will recognize that changes may be made in form and detail without departing from the spirit and scope of the invention.

What is claimed is:

1. A computer-implemented method for enabling a user to extract information from business data, comprising:
   receiving an object model description describing an object model used in collecting the business data;
   generating a dimensional object model and an analytical programming object model from the object model description, wherein generating comprises deriving data from both the dimensional model and the object model such that the analytical programming model represents data derived from both the dimensional model and the object model;
   automatically identifying, using a processor that is a functional component of the computer, a data navigation path between a set of business data in the object model and a set of business data in the analytical programming model;
   wherein automatically identifying a data navigation path further comprises acquiring a set of metadata from a metadata store, the set of metadata being utilized as a reference to support the automatic identification of the data navigation path;
   storing, on a computer-readable storage medium, a record of the automatically identified data navigation path;

providing an indication of the automatically identified data navigation path to the user, wherein the indication of the automatically identified data navigation path is provided to the user as part of a collection of automatically identified data navigation paths that includes an automatically identified logic association type of navigation path;

receiving, from the user, a command to activate the automatically identified data navigation path; and responding to the command by facilitating an automatic transitioning of a display of the business data, wherein automatically transitioning comprises automatically transitioning between a display of the set of business data in the object model and the set of business data in the analytical programming model.

2. The method of claim 1, wherein the method further comprises receiving a data context from the user.

3. The method of claim 1, wherein generating the analytical programming object model further comprises generating the analytical programming object model such that the make-up of the analytical programming object model reflects reference to, and dependence upon, data included in the object model description, a focal point identifier identifying information in the object model as a focal point, and mapping information indicative of a mapping between entities in the object model and a persistent data store.

4. The method of claim 2, wherein automatically identifying a data navigation path further comprises:

providing the data context to a provider that is associated with a first type of data navigation;

receiving from the provider a link representing the data navigation path, which is of the first type of data navigation, the data navigation path being selected by the provider based at least in part on a determined relevance to the data context; and wherein providing the indication of the automatically identified data navigation path to the user comprises providing said link to the user.

5. The method of claim 1, wherein the indication of the automatically identified data navigation path is provided to the user as part of a collection of automatically identified data navigation paths that include a drill down type of navigation path that facilitates a transition from aggregated data to underlying transactional data.

6. The method of claim 4, wherein the provider is one of a plurality of separate and distinct providers that are each configured to provide a different type of data navigation path for navigating through the business data.

7. The method of claim 1, wherein the indication of the automatically identified data navigation path is provided to the user as part of a collection of automatically identified data navigation paths that include a drill up type of navigation path that facilitates transition from transactional data to corresponding aggregated data.

8. The method of claim 1, wherein the indication of the automatically identified data navigation path is provided to the user as part of a collection of automatically identified data navigation path that includes a drill across type of navigation path.

9. The method of claim 1, wherein the indication of the automatically identified data navigation path is provided to the user as part of a collection of automatically identified data navigation paths that include a data navigation path that enables navigation between two data units determined to share a dimension within the dimensional model.

10. The method of claim 1, wherein the indication of the automatically identified data navigation path is provided to the user as part of a collection of automatically identified data navigation paths that include an automatically identified drill to details type of navigation path.

11. The method of claim 1, wherein the indication of the automatically identified data navigation path is provided to the user as part of a collection of automatically identified data navigation paths that include an automatically identified hierarchical data navigation path from one hierarchical level to another through a collection of data that is hierarchically organized.

12. The method of claim 1, wherein the indication of the automatically identified data navigation path is provided to the user as part of a collection of automatically identified data navigation paths that include an automatically identified data navigation path between two data collections that the user has identified as related.

13. The method of claim 1, wherein the indication of the automatically identified data navigation path provided to the user is a traversable data navigation link.

14. The method of claim 1, wherein the indication of the automatically identified data navigation path is provided to the user as part of a collection of data navigation links that each represent a data navigation path that is determined to be to be available based at least in part on a data context received from the user.

15. A system for enabling a user to extract information from business data, the system comprising:

a plurality of data navigation providers each providing a different type of data navigation;

a navigation service layer that transmits a navigation service request to one or more of the data navigation providers;

a metadata service that provides the plurality of data navigation providers with access to a metadata store, and wherein each data navigation provider responds to a received data navigation request by accessing the metadata service with a processor and processing metadata from the metadata store so as to automatically identify at least one data navigation path, and wherein a particular one of the plurality of data navigation providers responds to a received data navigation request by automatically identifying, based at least in part on said metadata accessed from the metadata service, a data navigation path between a set of business data in an object model and a set of business data in an analytical programming model, the analytical programming model being separate and distinct from the object model; and an output interface device that displays to the user the data navigation paths automatically identified by the plurality of data navigation providers, wherein the automatically identified data navigation paths are provided to the user on the output interface as part of a collection of automatically identified data navigation paths that includes an automatically identified logic association type of navigation path.

16. The system of claim 15, wherein the automatic identification of the data navigation path between the set of business data in the object model and the set of business data in the analytical programming model is further based on a determined relevance to the data navigation request received by the particular data navigation provider.

17. The system of claim 15, wherein the automatic identification of the data navigation path between the set of business data in the object model and the set of business data in the analytical programming model is further based on a determined relevance to a user-provided data context reflected in the data navigation request received by the particular data navigation provider.

18. The system of claim 15, wherein particular navigation provider provides the navigation service layer with an automatically derived navigation link that is indicative of the data navigation path between the set of business data in the object model and the set of business data in the analytical programming model.

19. The system of claim 18, wherein the navigation service layer provides the user with an aggregated collection of navigation links including the automatically derived navigation link received from the particular navigation provider.

20. The system of claim 19, wherein the navigation service layer receives a selection command from the user, the selection command selected from the aggregated collection of navigation links and indicating selection of the automatically derived navigation link received from the particular navigation provider.

21. The system of claim 20, wherein the navigation service layer transmits the selection command to the particular navigation provider.

22. The system of claim 21, wherein the system further comprises a data service provider that is associated with a data collection, the particular data navigation service provider interacting with the data service provider so as to retrieve data from the data collection, wherein the data retrieved from the data collection corresponds to the selection command.

23. The system of claim 22, wherein the data retrieved from the data collection represents a traversal of the selected navigation link and is returned to the user through the navigation service layer.

24. The system of claim 21, wherein the system further comprises a data service provider that is associated with a data warehouse, the particular navigation service provider interacting with the data service provider so as to retrieve data from the data warehouse, wherein the data retrieved from the data warehouse corresponds to the selection command.

25. The system of claim 21, wherein the system further comprises a data service provider that is associated with a database, the particular navigation service provider interacting with the data service provider so as to retrieve data from the database, wherein the data retrieved from the database corresponds to the selection command.

26. The system of claim 15, wherein one of the plurality of data navigation providers exclusively provides a type of data navigation that is navigation from aggregated data to related transaction data.

27. The system of claim 15, wherein one of the plurality of data navigation providers exclusively provides a type of data navigation that is navigation from transaction data to related aggregated data.

28. The system of claim 15, wherein one of the plurality of data navigation providers exclusively provides a type of data navigation that is a drill across type of navigation.

29. The system of claim 15, wherein one of the plurality of data navigation providers exclusively provides a type of data navigation that is navigation between two data units that share a dimension.

30. The system of claim 15, wherein one of the plurality of data navigation providers exclusively provides a type of data navigation that is a drill to details type of navigation.

31. The system of claim 15, wherein one of the plurality of data navigation providers exclusively provides a type of data navigation that is hierarchical navigation though collections of data that are hierarchically organized.

32. The system of claim 15, wherein one of the plurality of data navigation providers exclusively provides a type of data navigation that is navigation between two data collections that the user has identified as related.

33. The system of claim 15, wherein the navigation service layer supports at least one successfully registered additional data navigation provider, wherein the successfully registered additional data navigation provider becomes one of the plurality of data navigation providers.

34. A computer-implemented method for enabling a user to extract information from business data, comprising:
receiving an object model description describing an object model used in collecting the business data;
generating a dimensional object model and an analytical programming object model from the object model description, wherein generating comprises deriving data from both the dimensional model and the object model such that the analytical programming model represents data derived from both the dimensional model and the object model;
automatically identifying, using a processor that is a functional component of the computer, a data navigation path between a set of business data in the object model and a set of business data in the analytical programming model wherein automatically identifying a data navigation path further comprises acquiring a set of metadata from a metadata store, the set of metadata being utilized as a reference to support the automatic identification of the data navigation path; and
providing the user with an indication of the automatically identified data navigation path, wherein providing comprises providing as part of a collection of automatically identified data navigation paths that includes an automatically identified logic association type of navigation path.

* * * * *